(12) United States Patent
Oishi

(10) Patent No.: US 7,529,926 B2
(45) Date of Patent: May 5, 2009

(54) PUBLIC KEY CERTIFICATION PROVIDING APPARATUS

(75) Inventor: Kazuomi Oishi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 809 days.

(21) Appl. No.: 10/414,910

(22) Filed: Apr. 16, 2003

(65) Prior Publication Data

US 2003/0200437 A1    Oct. 23, 2003

(30) Foreign Application Priority Data

Apr. 17, 2002    (JP)    .............................. 2002-115095

(51) Int. Cl.
*H04L 29/00*    (2006.01)
*H04L 29/06*    (2006.01)
*H04L 9/00*    (2006.01)
*H04L 9/14*    (2006.01)
*H04K 1/00*    (2006.01)

(52) U.S. Cl. ...................... 713/156; 713/155; 713/157; 713/158; 713/162; 713/173; 380/30

(58) Field of Classification Search ................ 380/279, 380/282, 285, 30; 726/5, 18, 19; 713/155–158, 713/173–175, 162
See application file for complete search history.

(56) References Cited

U.S. PATENT DOCUMENTS

| | | | | |
|---|---|---|---|---|
| 5,606,617 A | * | 2/1997 | Brands | ......................... 380/30 |
| 5,689,565 A | * | 11/1997 | Spies et al. | ................. 713/189 |
| 5,790,677 A | * | 8/1998 | Fox et al. | ....................... 705/78 |
| 5,982,898 A | | 11/1999 | Hsu et al. | |
| 6,148,084 A | * | 11/2000 | Brands | ........................ 380/279 |
| 6,154,841 A | * | 11/2000 | Oishi | ......................... 713/180 |
| 6,233,341 B1 | * | 5/2001 | Riggins | ....................... 380/277 |
| 6,374,357 B1 | * | 4/2002 | Mohammed et al. | ........... 726/5 |
| 6,675,296 B1 | * | 1/2004 | Boeyen et al. | ............... 713/156 |
| 6,842,863 B1 | * | 1/2005 | Fox et al. | ........................ 726/5 |
| 7,194,620 B1 | * | 3/2007 | Hayes | ......................... 713/157 |
| 7,275,155 B1 | * | 9/2007 | Aull | ........................... 713/157 |
| 2001/0017856 A1 | | 8/2001 | Asokan et al. | |
| 2002/0004900 A1 | | 1/2002 | Patel | |

(Continued)

FOREIGN PATENT DOCUMENTS

EP    0386867 A2    9/1990

(Continued)

OTHER PUBLICATIONS

S. Thomson and T. Narten, IPv6 Stateless Address Autoconfiguration, The Internet Society, Dec. 1998.

(Continued)

*Primary Examiner*—Syed A. Zia
*Assistant Examiner*—Trang Doan
(74) *Attorney, Agent, or Firm*—Locke Lord Bissell & Liddell LLP

(57) ABSTRACT

A host communicates with a gateway, a DHCP server or a PPP peer of ISP to determine an IPv6 address, also receives a public key certificate from the gateway, the DHCP server or the PPP peer of ISP, and sends a public key certificate including an IPv6 address to a communication counterpart. The host receives a new public key certificate from the gateway, the DHCP server or the PPP peer of ISP when necessary.

25 Claims, 14 Drawing Sheets

Anonymous Public Key Certification Issue
General Protocol

U.S. PATENT DOCUMENTS

| | | | |
|---|---|---|---|
| 2002/0062438 A1* | 5/2002 | Asay et al. | 713/157 |
| 2002/0073311 A1* | 6/2002 | Futamura et al. | 713/157 |
| 2002/0116610 A1* | 8/2002 | Holmes et al. | 713/156 |
| 2003/0105876 A1* | 6/2003 | Angelo et al. | 709/237 |
| 2003/0110376 A1* | 6/2003 | Wiener et al. | 713/158 |
| 2004/0003236 A1* | 1/2004 | Jakobsson et al. | 713/156 |

FOREIGN PATENT DOCUMENTS

| | | |
|---|---|---|
| JP | 2000-115160 | 4/2000 |

OTHER PUBLICATIONS

T. Narten and R. Draves, Privacy Extensions for Stateless Address Autoconfiguration in IPv6, The Internet Society, Jan. 2001.

D. Harkins and D. Carrel, The Internet Key Exchange (IKE), The Internet Society, Nov. 1998.

Kazuomi Oishi, et al., Anonymous Public Key Certificates and Their Applications, IEICE Transactions on Fundamentals of Electronics, Communications and Computer Sciences, Jan. 1998.

European Search Report, Place of Search: Munich, Date of Search: Aug. 11, 2003.

K. Oishi, M. Mambo, E. Okamoto, "Anonymous Public Key certificates and Their Applications", IEICE Trans. Fundamentals, vol. E81-A, No. 1, Jan. 1998.

D. Harkins and D. Carrel, "The Internet Key Exchange (IKE)", Standards Track, Network Working Group, cisco System, Nov. 1998.

S. Thomson Bellcore, T. Narten, "IPv6 Stateless Address Autoconfiguration", Standards Track, Network Working Group, IBM, Dec. 1998.

T. Narten, R. Draves, "Privacy Extension for Stateless Address Autoconfiguration in IPv6", Standards Track, Network Working Group, IBM, Jan. 2001.

Chistein Huitema, "IPv6 The New Internet Protocol,", First Edition, pp. 72-80, published by Toppan Corp. Jan. 6, 1997.

Japanese Office Action dated Jun. 21, 2005 for related Japanese application JP 2003-085335.

* cited by examiner

Ethernet LAN Block Diagram

Node Architecture

FIG. 4

| C1 | C2 | C3 | M1 | M2 | M3 |

Ethernet MAC Address Architecture

FIG. 5

| C1' | C2 | C3 | 0xFF | 0xFE | M1 | M2 | M3 |

Interface ID Architecture

FIG. 6

| 0xFE | 0x80 | 0x0 | 0x0 | 0x0 | 0x0 | 0x0 | 0x0 | C1' | C2 | C3 | 0xFF | 0xFE | M1 | M2 | M3 |

A Tentative Link-Local Address Architecture

FIG. 7

| 0xFF | 0x02 | 0x0 | 0x0 | 0x0 | 0x0 | 0x0 | 0x0 | 0x0 | 0x0 | 0x0 | 0x1 | 0xFF | M1 | M2 | M3 |

Architecture of Solicited-Node Multicast Address of Given Tentative Link-Local Address Flowchart of Address Auto-Configuration Flowchart of Retrieving Address with DHCP Flowchart of Address Auto-Configuration and Receiving Anonymous Public Key Certification Flowchart of Receiving Address and Certificate with DHCP Anonymous Public Key Certification
Issue Protocol (for PPP)

Dial-Up/ADSL Connection Block Diagram

Anonymous Public Key Certification
Issue Protocol (for Ethernet LAN)

Flowchart of Retrieving Certificate by Host

PUBLIC KEY CERTIFICATION PROVIDING APPARATUS

BACKGROUND OF THE INVENTION

1. Field of the Invention

The present invention relates to an apparatus for providing a public key certificate.

2. Description of the Related Art

With the emergence of IPv6, there is anticipated a situation which enables a network connection of an equipment, that has not been connectable to a network. An example of such equipment is a digital camera for end users, directly connectable to the Internet.

In a personal computer or a work station supporting IPv6, the Ethernet® is normally employed as an interface for connection with the network, and an IEEE identifier (MAC address) provided therein is used for constructing an IPv6 address.

The IPv6 is present in three kinds, namely a link local address, a site local address and a (aggregatable) global address.

An address system, including details of these addresses and a constructing method thereof, is described for example in RFC 2373 "IP Version 6 Addressing Architecture", RFC 2374 "An IPv6 Aggregatable Global Unicast Address Format", RFC 2375 "IPv6 Multicast Address Assignment", RFC 2350 "Proposed TLA and NLAA Assignment Rule", RFC 2461 "Neighbor Discovery for IP Version 6 (IPv6)", and RFC 2462 "IPv6 Stateless Address Autoconfiguration".

However, in case information corresponding one-to-one to a hardware, such as IEEE identifier (MAC address), is used in a fixed manner, such information may be regarded as corresponding one-to-one to the apparatus or the user thereof, and invasion of privacy may result by monitoring communications utilizing such address.

In order to prevent such drawback, a method of generating a random IPv6 address (more exactly an interface ID) is proposed for example in FRC 3041 "Privacy Extensions for Stateless Address Autoconfiguration in IPv6".

There is also described a protocol (or extension thereof), in case a randomly generated value is already used, for detecting such state and calculating/generating another random value, thereby determining a unique random value.

Now let us consider an encrypted communication utilizing IPsec, in case the apparatus utilizes an IPv6 address generated by a method as described in the foregoing.

IPsec is a protocol in which two apparatuses on the internet share secret data not known to any other, and encryption and authentication are executed based on such secret data, it is necessary in the communication to securely share secret data and mutual IPv6 addresses. The data such as the secret data and mutual IPv6 addresses are called SA (Security association).

A protocol for securely sharing SA is called IKE (Internet key exchange) and is defined in RFC 2409 "The Internet Key Exchange (IKE)". Securely sharing of SA means to securely share SA only with an intended counterpart, and requires secure authentication of the counterpart. The IKE defines four authentication methods, namely 1) a method utilizing a pre-shared key, 2) a method utilizing a digital signature, 3) authentication with public key encryption, and 4) a revised method of authentication with public key encryption.

However, in consideration of a situation realizing protection of privacy (not providing identifying information), for example in an IPsec communication of a user with a shopping site, it is practically impossible for the shopping site to share pre-shared keys with unspecified plural communication counterparts prior to the IPsec communication, so that the method utilizing the pre-shared key is not usable.

In other methods, it is possible execute IKE among unspecified plural communication partners in case information (public key in most cases) necessary for using the digital signature or the public key encryption can be made securely available. For this purpose, what is considered most promising is an environment or a system called PKI (public-key infrastructure), and, a public key certificate plays a principal role therein.

The public key certificate is a digital signature for confirming and ensuring a correspondence between an entity (entity executing communication such as a computer or a person) and a public key of such entity, issued by a third party reliable for a combination of the ID information etc. of the entity and the public key. The reliable third party is called CA (certification authority), and the public key for confirming the authority of the digital signature of CA is widely known.

However, the currently utilized public key certificate includes ID information of the owner (subject) such as FQDN (fully qualified domain name) and cannot therefore realize the privacy protection in this state.

There is also conceived a method of not including the ID information of the subject in the public key certificate, and such certificate is called anonymous public key certificate.

However, such anonymous public key certificate is still associated with a drawback same as in the aforementioned IEEE identifier (MAC address). More specifically, as long as a same anonymous public key certificate is used continuously, it is possible to link plural communications (such as IPsec based on the public key certificate), and, the correspondence between the anonymous public key certificate and the subject thereof, if found out even once, leads to an invasion of privacy, so that the level of privacy protection is still weak.

In consideration of these drawbacks, a strong privacy protection is conceived realizable if it is possible to use a different IPv6 address and a different anonymous public key certificate in a communication with a different counterpart. These are called one-time IPv6 address and one-time anonymous public key certificate. Such one-time IPv6 address may be changed for every communication counterpart or for every packet.

However, for such one-time IPv6 address, there is known the aforementioned FRC 3041 "Privacy Extensions for Stateless Address Autoconfiguration in IPv6", but there has not been known a method of efficiently and securely issuing the one-time anonymous public key certificate to an apparatus capable of IPv6 communication (hereinafter called IPv6 supporting apparatus).

There also exists a following drawback. In case the ID information of the communication counterpart is not known, the communication counterpart is identified by the IP address only. However, since a packet exchanged on a LAN of Ethernet® can be accessed by all the nodes on such LAN, in a situation of a communication between entities A and B, a malicious entity C present on the same LAN may impersonate as the entity A. More specifically, when the public key certificate of the entity A is transmitted to B for executing an IPsec communication based on a one-time anonymous public key certificate between A and B, C can disguise as A by replacing the public key certificate of A by that of C. Such impersonation is also possible over a wider range not limited to a LAN, by applying a DoS (Denial of Services) attack to a DNS (Domain Name System) server or router and providing a false information by a false DNS server or router during such attack. Such situation can be cope with by confirming the ID of the counterpart in case such ID is known, but there has not been known a method of preventing such attack in the above-described situation of anonymous communication.

SUMMARY OF THE INVENTION

An object of the present invention is to realize a one-time IPv6 address and a one-time anonymous public key certificate including the same.

Another object of the present invention is to alleviate a burden of calculation by a host in generating an anonymous public key.

Still another object of the present invention is to efficiently realize a one-time anonymous public key certificate that has a high level of privacy protection, is realizable with a low cost and shows a little burden at the execution.

Still another object of the present invention is to realize an IPsec communication by IKE realizing strong privacy protection and preventing disguising.

Still another object of the present invention is to enable an issuer of a public key certificate to easily confirm uniqueness of an IPv6 address used by an IPv6 supporting apparatus, and to issue the public key certificate upon such confirmation.

Still another object of the present invention is to efficiently and securely issue a one-time anonymous public key certificate including an IPv6 address as a target of certification, thus achieving prompt issuance without an error in the target of issuance.

Still another object of the present invention is to execute IKE and IPsec communications utilizing a one-time anonymous public key certificate including an IPv6 address as a target of certification.

Still another object of the present invention is to efficiently realize an IPsec communication utilizing an anonymous public key certificate including a random IPv6 address and different every time, thereby realizing strong privacy protection and preventing disguising.

Still other objects of the present invention will become apparent from following description of embodiments.

BRIEF DESCRIPTION OF THE DRAWINGS

FIG. 4 is a view showing an architecture of a MAC address of Ethernet®;

FIG. 5 is a view showing an architecture of an interface ID;

FIG. 6 is a view showing an architecture of a tentative link-local address;

FIG. 7 is a view showing an architecture of a solicited-node multicast address of a given tentative link-local address;

DETAILED DESCRIPTION OF THE PREFERRED EMBODIMENTS

First Embodiment

This embodiment shows a case where a host is connected to the internet through an Ethernet® LAN. At first there will be explained a current situation, and the present embodiment will be explained later.

Figure 2:
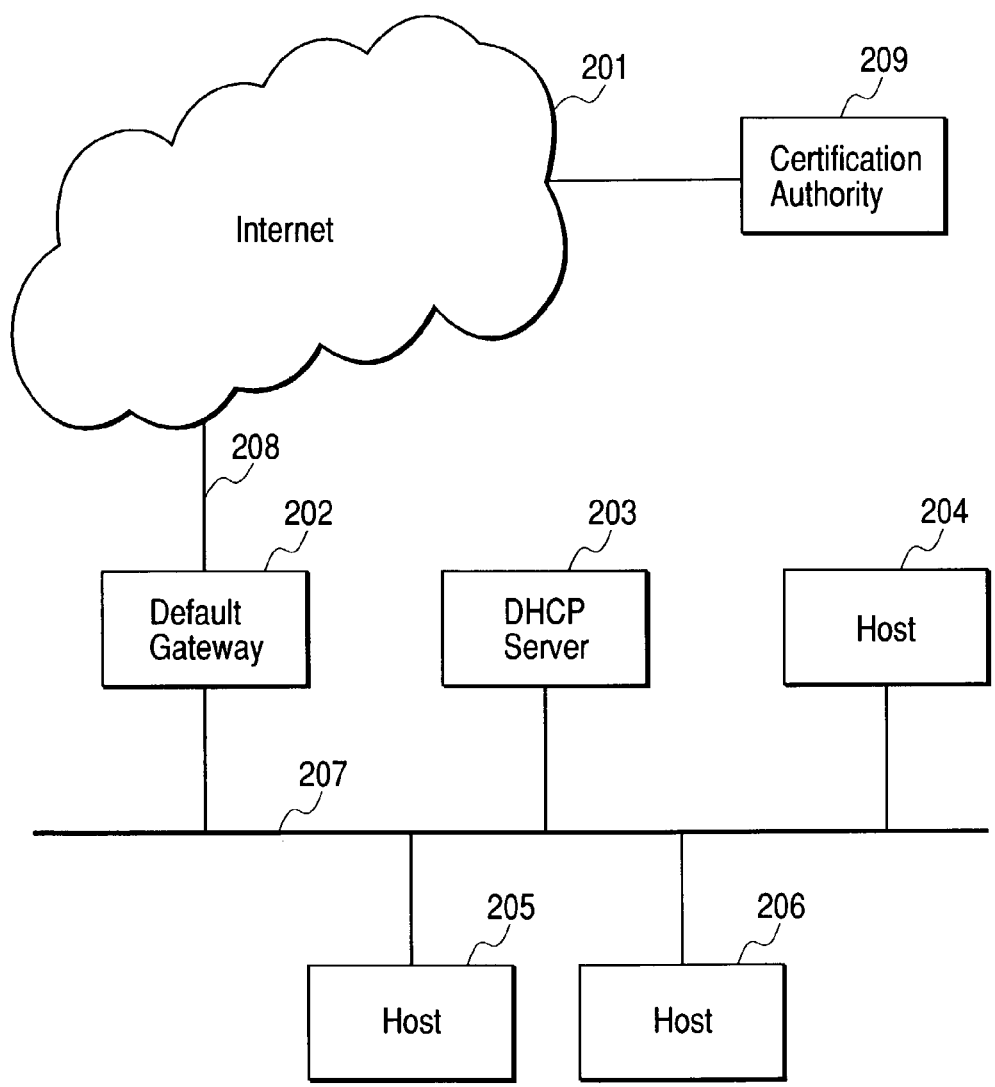
FIG. 2 is a block diagram of an Ethernet®.

FIG. 2 schematically shows a connection environment (connecting the host to the internet through an Ethernet® LAN) in which the present invention is applicable.

FIG. 2 shows an environment in which hosts 204, 205, 206 connected a LAN make an access to an internet 201 through a default gateway (gateway) 202. In the present embodiment, each host is connected through a link, which is specifically assumed as an Ethernet®. The link means a facility or a medium through which an apparatus connected thereto can execute communication, and is positioned at the lower side of the IP layer. In addition to the Ethernet®, the link may be a PPP link, a X.25, a frame relay or an ATM network.

An IPv6 supporting apparatus connected to the link is called a node.

Figure 3:
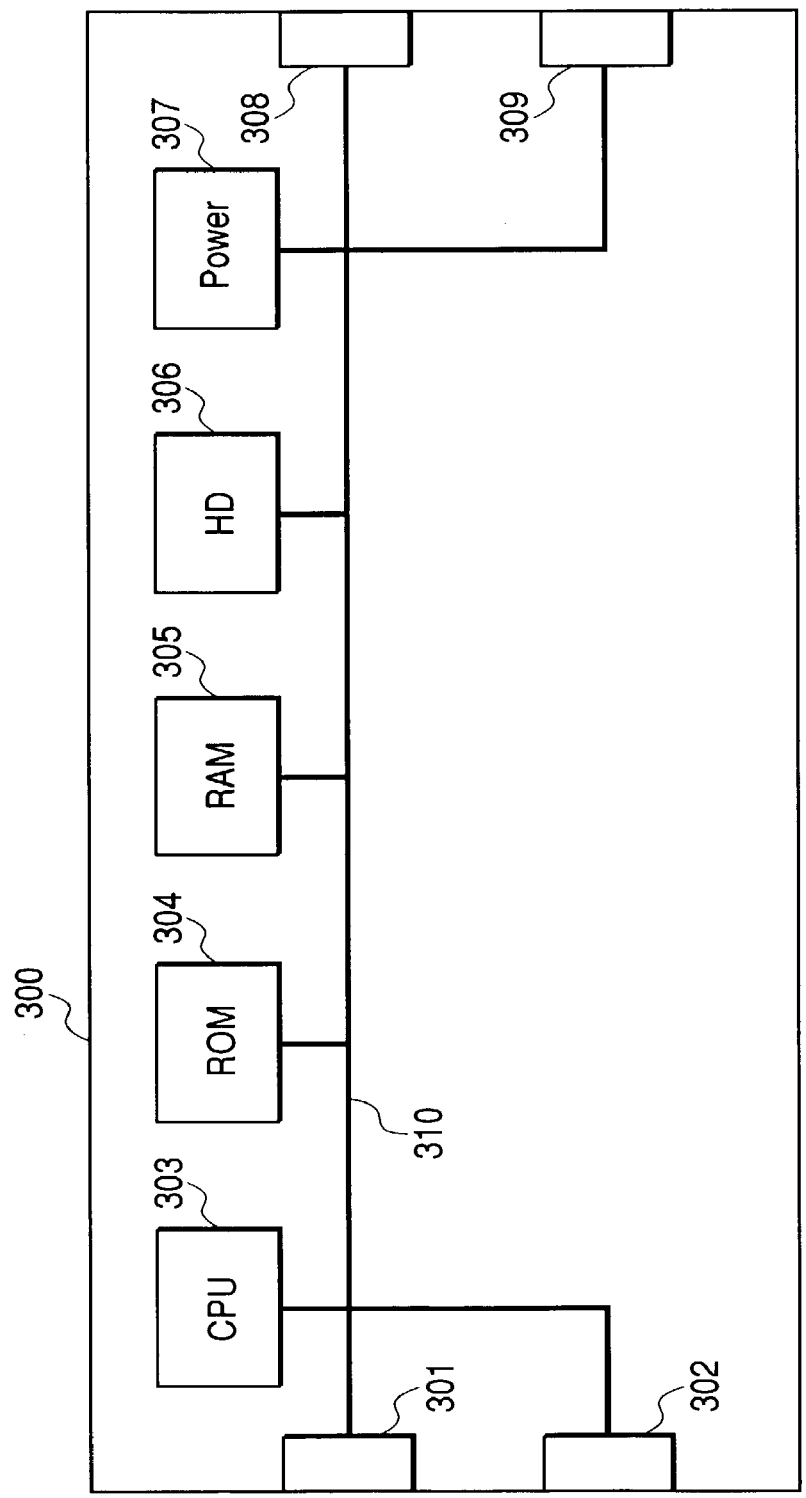
FIG. 3 is a view showing an architecture of a node.

FIG. 3 shows a typical internal architecture of a node.

The node can be a router or a host, and the router transfers a packet not addressed thereto, while the host does not execute such transfer. As will be apparent from FIG. 3, the node 300 is a computer having network interfaces 301, 302, a CPU 303, a ROM 304, a RAM 305, a HD (hard disk) 306, a power supply 307, an interface 308 for a keyboard/pointing device, an interface 309 for a monitor, a bus 310 etc.

The router has plural network interfaces 301, 302, but the host has only one network interface 301 in most cases. The hosts 204, 205, 206 communicate, by the network interface 301 and through the link 207, with another node connected to the link 207, or with a site on the internet 207 further through a gateway 202. The default gateway 202 executes communication, by the network interface 301, with another node connected to the link 207, and by the network interface 302 through the internet 201. The HD may be absent in certain nodes.

Following process content (procedure) is realized as an apparatus or a program, and is executed by a node having such apparatus or by a node in which such program is stored in the ROM 304 or the RAM 305. For example, in case of realization as a program, the CPU 303 of the computer executes operations of reading such program, and assigning an address to the interface 301 through the bus 310 while utilizing the RAM 305 as a space for calculation if necessary.

In the following there will be explained the basis of the procedure such as assigning an address to the interface.

At first there will be briefly explained the architecture of a protocol in which each host retrieves a prefix of a global address or an address of the default gateway 202 in the Ethernet® LAN environment in the present embodiment, and then explained is a specific embodiment embodying the present invention.

Figure 8:
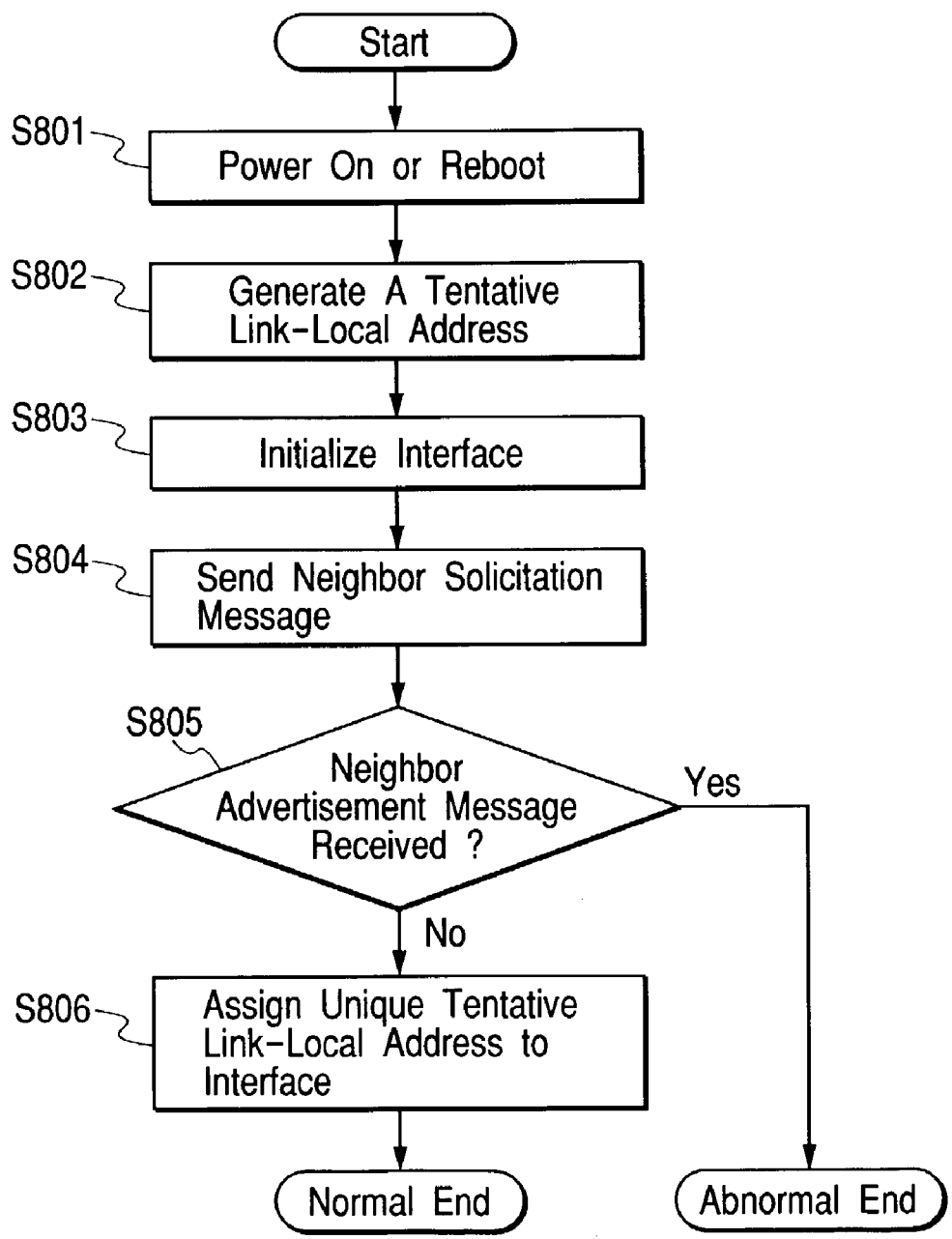
FIG. 8 is a flow chart showing operations until a host completes DAD.

FIG. 8 shows a flow chart of a procedure executed by a node 300 connected to the link 207 shown in FIG. 2, when the power supply is turned on or in case of a re-booting. This procedure is called DAD (duplicate address detection). In the following there will be explained contents of the procedure until the node 300 completes DAD along the flow shown in FIG. 8.

After the node 300 is powered or re-booted in a step S801, an interface ID (cf. FIG. 5) is prepared from a MAC address of Ethernet® (MAC address) (cf. FIG. 4) assigned to the interface 301, and is used as a tentative link-local address (cf. FIG. 6) (step S802).

Then, in order to discriminate whether such tentative link-local address is unique on the ink, the node (host) 300 executes a following procedure.

At first there is executed an initialization of the interface 301. More specifically, an all-nodes multicast address (FF02: 1) and a solicited-node multicast address, which is a tentative link-local address thereof, are assigned to the interface 301 (FIG. 7). As a result, the interface 301, upon finding a packet address to the all-nodes multicast address or to the solicited-node multicast address of the tentative link-local address thereof, receives such packet as addressed to such interface.

The assigning of the former (all-nodes multicast address) allows to receive data from another node which already uses the tentative link-local address thereof. Also the assigning of the latter (solicited-node multicast address of such tentative link-local address) allows to detect the presence of another node which is going to simultaneously use same tentative link-local address.

The solicited-node multicast address of a tentative link-local address is, as defined in page 91 of RFC 2461, data formed by adding lower 24 bits of the tentative link-local address to a prefix FF02:0:0:0:0:1:FF00::/104 and constitutes a link-local scope multicast address. FIGS. 6 and 7 show these relationships. The aforementioned address assignment is executed in a step S803 in FIG. 8.

Then a Neighbor Solicitation message is prepared. In the Neighbor Solicitation message, a tentative link-local address of a target of judgment is set in a Target Address, and an unspecified address (128 bits all being 0) is set in an IP Source (transmission source address), and a solicited-node multicast address of the tentative link-local address of the target of judgment is set in an IP destination (destination address).

This Neighbor Solicitation message is transmitted to the Ethernet® DupAddrDetectTransmits times with a millisecond interval of RetransTimer. This process is executed in a step S804 in FIG. 8.

Upon receiving the Neighbor Solicitation message, the node judges that such message is from a node executing DAD, in case the transmission source address is the unspecified address.

In case plural nodes executes DAD for a same address, the plural nodes, to which the solicited-node multicast address of the tentative link-local address thereof is assigned, receive plural Neighbor Solicitation messages containing a same address in the Target Address (namely a Neighbor Solicitation message transmitted by itself and a Neighbor Solicitation message transmitted by another node executing DAD for a same address), whereby a duplication can be identified. In such case, such address is not used by any node.

In case the received Neighbor Solicitation message is the one transmitted by itself (namely by loop-back of the multicast packet), it does not indicate the presence of another node which uses or is going to use such address. In case of receiving, in addition to the Neighbor Solicitation message transmitted by itself, a Neighbor Solicitation message including a same address in the Target Address, there is judged that plural nodes are executing DAD for a same target address.

On the other hand, in case a node receiving the Neighbor Solicitation message already uses an address contained in the Target Address of such message, it returns a multicast Neighbor Advertisement, in which such tentative lonk-local address is set in the Target Address, to an all-nodes multicast address. Thus, in case the node, having transmitted the Neighbor Solicitation message, receives a multicast Neighbor Advertisement addressed to the all-nodes multicast address and the target address thereof is the tentative address (target) (corresponding to a case "YES" in a step S805 in FIG. 8), it can be judged that the tentative address of the target is not unique (namely duplicated).

In case the aforementioned DAD confirms that the tentative link-local address of the target is unique on the link (corresponding to a case "NO" in a step S805 in FIG. 8), such address is assigned as a link-local address to the interface 301. This operation corresponds to a step S806 in FIG. 8, and the DAD process is terminated.

The aforementioned procedure of FIG. 8 can be executed in each of the default gateway 202 which is a node connected to the link 207 shown in FIG. 2, the DHCP server 203, and the hosts 204, 205, 206 on the network interface 301 including the link 207.

A host in FIG. 2, for example the host 206, after assigning the link-local address to the interface 301, tries to obtain necessary information for determining a site local address or a global address (such information being called Router Advertisement) from the default gateway 202. Such operation is shown in FIG. 9.

The default gateway 202, normally called a router, will be hereinafter represented as a router 202. The router 202 is given necessary setting by a administrator, and periodically transmits a Router Advertisement to the link 207. In case the host 206 wishes to obtain the Router Advertisement promptly, it sends data, called Router Solicitation, to the router 202. Immediately after the assignment of the link-local address, the host 206 cannot identify the presence of the router 202, so that the Router Solicitation is transmitted as a multicast to all the routers on the link 207. In FIG. 9, a step S901 indicates this process.

The router 202, having received the Router Solicitation, sends a Router Advertisement. As indicated by a case "YES" in a step S902 in FIG. 9, the host 206, having received a Router Advertisement message designating a Stateless address autoconfiguration only, confirms validity (for example not being already used in the apparatus) of the prefix in the received message, and assigns an address prepared by adding a suitable interface ID, as a site local address or a global address to the interface 301. A step S903 in FIG. 9 corresponds to this process.

Figure 9:
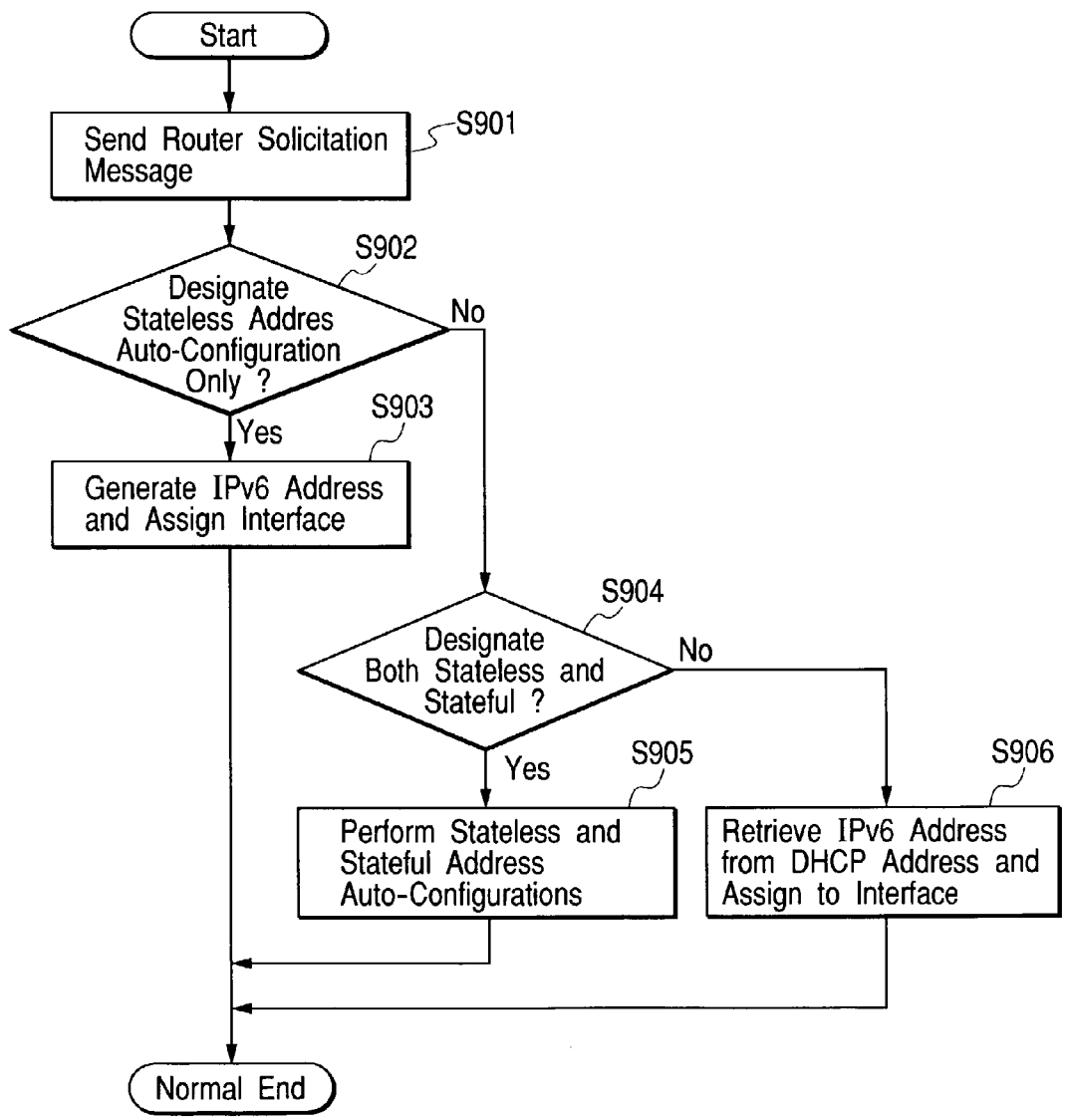
FIG. 9 is a flow chart showing operations until the host completes autoconfiguration.

In case, as indicated by a case "NO" in the step S902 in FIG. 9, the host 206 does not receive a Router Advertisement message designating a Stateless address autoconfiguration only, the process is divided into following two cases, namely a case of receiving a Router Advertisement designating both a stateless address autoconfiguration and a stateful address autoconfiguration ("YES" in step S904) and a case not receiving any Router Advertisement ("NO" in the step S904). In the latter case, there is executed a stateful address autoconfiguration, namely DHCPv6 only. This operation corresponds to a step S906, of which details are shown in FIG. 10.

The DHCP server 203 is subjected to necessary settings by the administrator. More specifically, its link local address as a node is assigned to the network interface 301, and there is also set a prefix etc. for a site local address or a global address necessary for behaving as the DHCP server.

Figure 10:
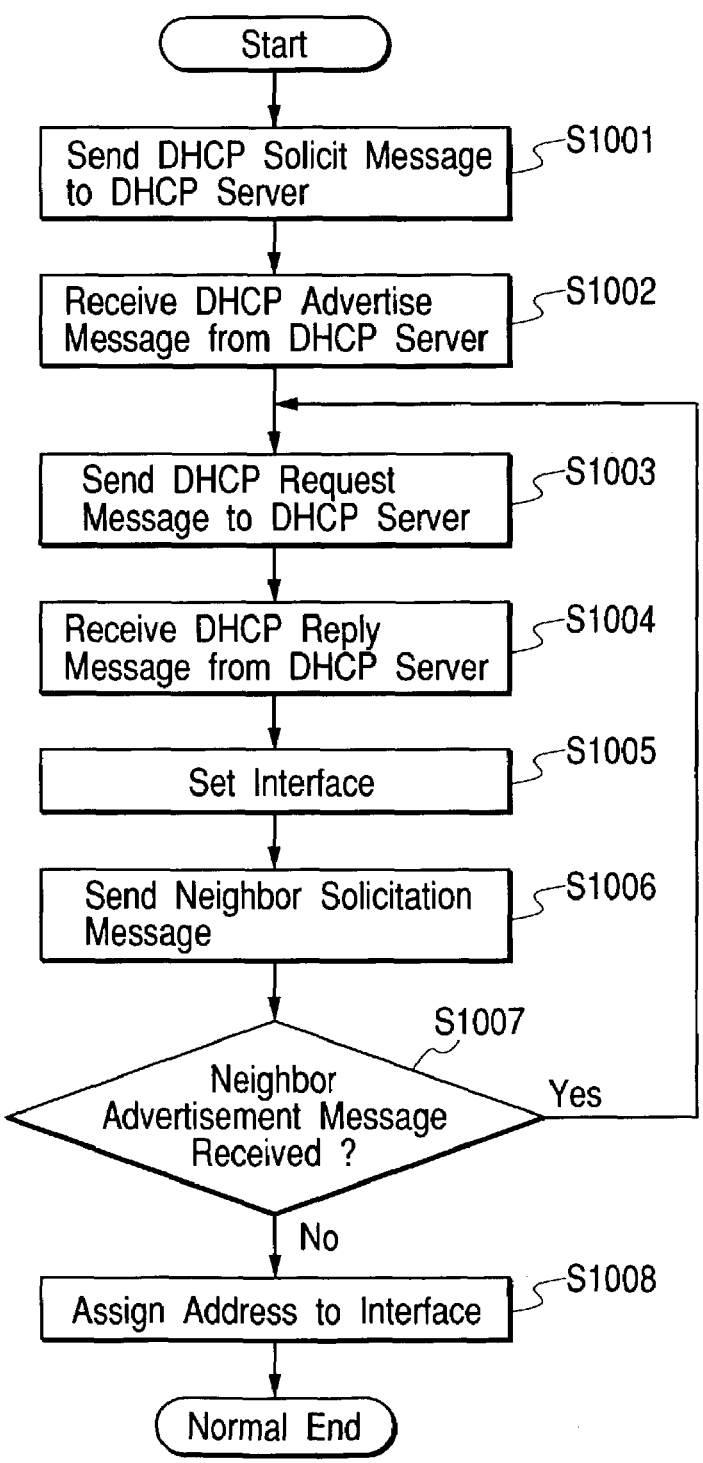
FIG. 10 is a flow chart showing operations until the host retrieves an address.

In a step S1001 in FIG. 10, the host 206 sends a DHCP Solicit Message to the DHCP server. As the host 206 does not known the location of the DHCP server 203, it is sent as a multicast to the DHCP server 203. In case the DHCP server is present in a link (not shown) different from the link 207 to which the host 206 is connected, the DHCP Solicit Message is in fact delivered to the DHCP server 203 through a DHCP relay (not shown).

The DHCP server 203, receiving the DHCP Solicit Message, returns a DHCP Advertise Message as a response to the host 206. It is delivered to the host 206 (through the DHCP relay in case of different links). This operation constitutes a step S1002. At this point, the address of the DHCP server 203 becomes known to the host 206.

Then, in a step S1003, the host 206 sends a DHCP Request Message to the DHCP server 203. Upon receiving the DHCP Request Message, the DHCP server 203 sends a DHCP Reply Message to the host 206.

In a step S1004, the host 206, having received the DHCP Reply Message, determines a site local address or a global address therein and executes a process necessary for the DAD process, in order to confirm whether the interface ID in such address shows a duplication. More specifically, as in the step S803, a multicast address etc. are set in the interface 301. This operation constitutes a step S1005.

Then a step S1006 sends a Neighbor Solicitation Message similar to that in the step S804, and a step S1007 discriminates whether a Neighbor Solicitation Message is received. In case of reception, such address shows a duplication, so that the sequence returns to the step S1003 for receiving another address from the DHCP server 203 and repeats the aforementioned process.

In case the Neighbor Solicitation Message is not received in the step S1007 in FIG. 10, the address does not show duplication and the host 206 assigns, in a step S1008, a site local address or a global address determined from the DHCP Reply Message to the interface 301.

Thus the step S906 in FIG. 8 is terminated. The sequence is terminated in normal manner in case no Router Advertisement is received in the step S904.

In case the step S904 receives a Router Advertisement message designating both the stateless address autoconfiguration and the stateful address autoconfiguration, a step S905 executes both a stateless address autoconfiguration and a stateful address autoconfiguration. The content of the process is same as that of the steps S903 and S906.

As explained in the foregoing, the host 206 having the Ethernet® 207 as the interface can utilize the stateless address autoconfiguration and the stateful address autoconfiguration in an arbitrary combination, thereby automatically setting the link local address, the site local address, the global address, the default gateway etc.

In the aforementioned protocol, by employing a random value for the interface ID, executing DAD for such value as the target and confirming the uniqueness in the ink 207, there can be obtained a one-time IPv6 global address in combination with a prefix of the global address obtained from the gateway 202 or the DHCP server 203. Such process is described in RFC 3041 "Privacy Extensions for Stateless Address Autoconfiguration in IPv6".

In the following there will be explained an embodiment of the present invention, in which the aforementioned operations (protocol) are expanded to enable the use of a one-time anonymous public key certificate. At first there will be explained an example of an anonymous public key certificate, and a protocol for efficient issuance thereof will be explained.

As to the anonymous public key certificate, a concept and a specific realizing method therefor are proposed by Kazuomi Oishi, Masahiro Mambo, and Eiji Okamoto, "Anonymous Public Key Certificates and their Applications" IEICE Transactions on Fundamentals of Electronics, Communications and Computer Sciences, E81-A, 1, pp. 56-64, 1998, and a basic realizing method is disclosed in U.S. Pat. No. 6,154, 841. In these methods, the anonymity of the certificate is ensured by the amount of calculation. For providing a stronger anonymity, a method of realizing an anonymous public key certificate with unconditional anonymity is disclosed by Kazuomi Oishi, "Unconditionally anonymous public key certificates", The 2000 Symposium on Cryptography and Information Security, SCIS2000-C32, 2000.

In the present invention, there can be utilized any scheme described in the aforementioned paper by Kazuomi Oishi, Masahiro Mambo and Eiji Okamoto, "Anonymous Public Key Certificates and their Applications". If an inferior efficiency is tolerated, there can be utilized a scheme 1, a scheme 2 or a scheme 3 in the aforementioned paper, and these are also included in the present invention. The present embodiment shows a case where an anonymous public key certificate with computational anonymity is utilized. The details are to be referred to the aforementioned paper, and the protocol of the present embodiment will be explained after defining symbols necessary for the explanation.

An entity CA issuing an anonymous public key certificate determines large prime numbers p and q as common parameters. The prime number q can divide p-1. There are determined a generator g of an order q and a Hash function H. A secret random number $s\_ca$ (between 1 and q, inclusive) is generated and $v\_ca=g^{(s\_ca)} \bmod p$ is calculated. $A=(B)^{(C)} \bmod D$ means a calculation, for integers A, B, C and D, of dividing B to a power C with D to obtain a remainder A. The entity CA discloses p, q, g, H and $v\_ca$. On the other hand, an entity i utilizing the anonymous public key certificate generates a secret random number $s\_i$ (between 1 and q, inclusive) and calculates $v\_i=g^{(s\_i)} \bmod p$.

$s\_ca$ and $s\_i$ are called secret keys while $v\_ca$ and $v\_i$ (and disclosed parameters) are called public keys, and the secret keys are so stored as not to be disclosed to any other party.

At the start of use of the anonymous public key certificate, the entity i registers its entity name (user name), a password and the public key $v\_i$ to the entity CA. The entity CA confirms, if necessary, the identity of the entity i by physical means or the like, and memorizes the entity name (user name), a password and the public key $v\_i$.

In issuing an anonymous public key certificate, the entity CA generates a random number r (between 1 and q, inclusive), and calculates $(g', v\_i')=(g^r \bmod p, (v\_i)^{(r)} \bmod p)$. Let X be management/attribute information of a certificate. Then, X includes the aforementioned public parameters, the validity period of the anonymous public key certificate, a public key certificate for the public key $V\_ca$, etc. A digital signature is generated for a message (a Hash value thereof) including $(g', v\_i')$ and X. There can be utilized a digital signature scheme based on a discrete logarithm problem, for example a Schnorr signature. In this embodiment, there is used the secret key $s\_ca$. Such digital signature is represented as $Sig\_ca(g', v\_i', X)$.

An anonymous public key certificate $APC\_ca(i)$ issued by the entity CA to the entity i is $APC\_ca(i)=(g', v\_i', X, Sig\_ca(g', v\_i', X))$.

Receiving the issuance of the anonymous public key certificate APC_ca(i)=(g', v_i', X, Sig_ca(g', v_i', X)), the entity i extracts (g', v_i', X) and calculates a Hash value thereof (for example H(g'|v_i'|X), wherein "|" indicates concatenation), thereby confirming whether Sig_ca(g', v_i', X) is a correct digital signature for the Hash value, utilizing the public key v_ca. It also confirms v_i'=(g')^(s_i) mod p. Upon confirmation of these as correct, there can be utilized a public key encryption or a digital signature based on discrete logarithm problem utilizing g' and v_i' (and common parameter p) as public keys and s_i as a secret key. Thus the anonymous public key certificate APC_ca(i) includes a validity period in the management/attribute information X, and the public keys g' and v_i' contained in the anonymous public key certificate APC_ca(i) are the public keys of a same entity but are changed with the lapse of time.

An entity, receiving the anonymous public key certificate APC_ca(i)=(g', v_i', X, Sig_ca(g', v_i', X)), extracts (g', v_i', X) and calculates a Hash value thereof, thereby confirming whether Sig_ca(g', v_i', X is a correct digital signature for the Hash value, utilizing the public key v_ca. Upon confirmation as correct, there are executed a public key encryption or an authentication of a digital signature based on discrete logarithm problem utilizing g' and v_' (and common parameter p) as public keys.

The legitimacy of the public key v_ca itself can be confirmed by the issuance of a public key certificate for the public key v_ca, by submitting the public key v_ca to an upper or more pervasive entity CA, for example VeriSign which provides a commercial certifying service. The management/attribute information X of the anonymous public key certificate includes a public key certificate for the public key v_ca. The legitimacy of the public key v_ca itself can be confirmed by such public key certificate for the public key v_ca. This corresponds to a hierarchical configuration of the entity CA, and allows to construct an appropriate PKI (Public-key Infrastructure).

In the foregoing there has been explained a signature system based on the difficulty of discrete logarithm problem on a multiplicative group (mod p), but it is also possible to utilize a signature system based on the difficulty of discrete logarithm problem on an elliptical curve, and, in such case, the efficiency can be further improved as a same level of security can be anticipated with a key of a smaller number of bits in comparison with the case of the multiplicative group.

In the following there will be explained a case of applying the aforementioned anonymous public key certification system to the environment shown in FIG. 2.

The default gateway 202 or the DHCP server 203 becomes the entity CA for issuing the anonymous public key certificate, while the host 206 (or the user thereof) becomes the entity utilizing the anonymous public key certificate. Otherwise, there may be provided an exclusive CA server for executing the issuance of the certificate only. In the following, there will be explained a case where the default gateway 202 serves as the entity CA issuing the anonymous public key certificate and a random IPv6 address is included in the certificate, but it is also possible that the DHCP server or the exclusive CA server becomes the entity CA issuing the anonymous public key certificate or that the random IPv6 address is not included in the certificate. The default gateway 202 provides the host 206 with a prefix of the global address of IPv6. The default gateway 202, which is often a router as explained before, will be called a router 202.

The adminstrator of the router 202 determines and discloses the aforementioned public parameters p, g etc. Also it determines the public key v_ca for the entity CA issuing the anonymous public key certificate, and submits it to an upper or more pervasive CA (209 in FIG. 2), for example VeriSign providing a commercial authentication service, to receive a public key certificate for the public key v_ca.

The router (gateway) 202 has a function of controlling the transfer of packets, and is operated under the management of the administrator, so as not to cause inappropriate packet exchange between a subnet managed by the router and the exterior. For a subnet to be connected to the internet, the administrator of the subnet registers the identity to JPNIC (in case of Japan) and receives an assignment of a set of IP addresses. The router in the subnet therefore is managed by the administrator with a clear responsibility of management and is expected to spend costs for the operation and management also in consideration of the security, it can be considered appropriate as the entity CA for issuing the anonymous public key certificate.

When a user i applies for an access to the LAN, the user generates its own secret key s_i utilizing the public parameters p, g etc., calculates a corresponding public key v_i and submits the user name, the password and the public key v_i to the administrator of LAN (administrator of the router 202). The administrator of LAN (administrator of the router 202), after executing an identification of the user i and a password check according to its operating policy, permits an access. The administrator makes a registration in the RAM 304 or the HD 306 in such a manner that the corresponding public key can be retrieved from the entity name. The public parameters p, g etc. and the public key v_i, and particularly the secret key s_i are managed by the user i and are made securely usable in the host 206.

Figure 1:
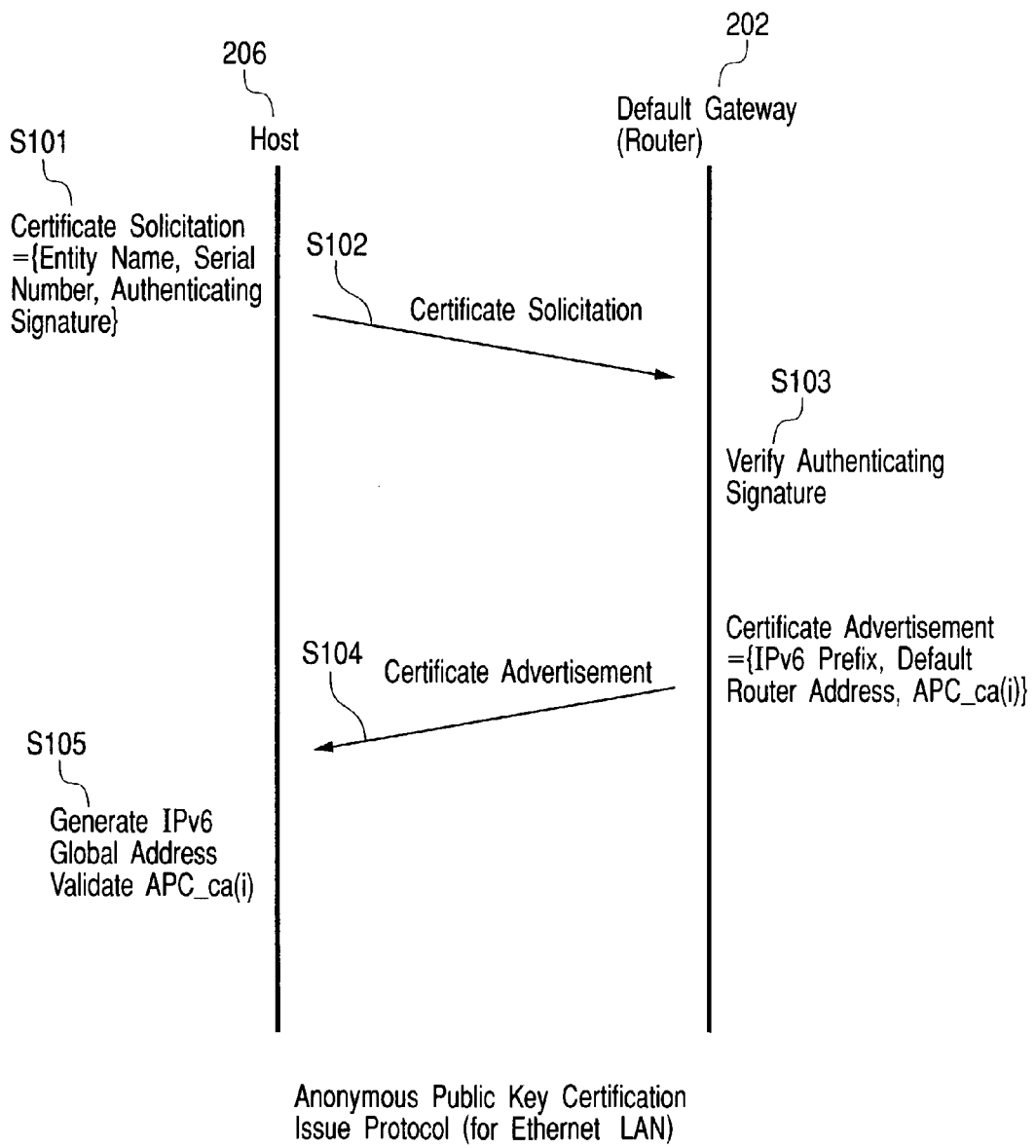
FIG. 1 is a view showing a protocol for issuing an anonymous public key certificate (for Ethernet® LAN) in a first embodiment.

FIG. 1 shows a protocol of the present embodiment, which is executed after the aforementioned preparations. FIG. 1 shows an issuing protocol for an anonymous public key certificate between an entity utilizing the anonymous public key certificate (IPv6 terminal utilized by the user i), constituted by the host 206 and an entity CA issuing the anonymous public key certificate, constituted by the router 202. Thus an IPv6 supporting apparatus 202, present in a local link 207, serves as the issuer of the public key certificate.

Since it is necessary to specify the entity in order to issue the anonymous public key certificate, there is executed a specifying (authentication) protocol between the router 202 and the entity (host 206 in this case). In the present embodiment, there will be explained a system based on a public key encryption as will be explained in the following. The operations will be explained according to a flow in FIG. 1.

In a step S101, the host 206 generates a Certificate Solicitation. The Certificate Solicitation is a message requesting an anonymous public key certificate and is generated in such a format understandable to the router 202 that it requests an anonymous public key certificate and that it contains the interface ID of the host 206. The content is calculated from the entity name (user name), the password and a serial number. The serial number is, for example, formed by concatenating an IPv6 link local address of the host 206, an IPv6 link local address of the default gateway 202 and a current time. In order to prevent a reply attack and an impersonation, the Certificate Solicitation contains a digital signature (authenticating signature) (Sig_i (hash(entity name, password, serial number))) generated by entering the entity name (user name), the password and the serial number into the Hash function utilizing the secret key s_i.

Then, in a step S102, the host 206 sends the Certificate Solicitation to the router 202 through the link 207.

In a step S103, the router 202 retrieves, based on the entity name (identifier of the communication apparatus (host) 206)

contained in the Certificate Solicitation received in the step S102, the registered public key v_i from the RAM 305 or the HD 306, and confirms the legitimacy of the authenticating signature utilizing such public key. More specifically, the entity name (user name), the password and the serial number are entered into the Hash function to obtain a Hash value, and it is confirmed that the authenticating signature is a proper digital signature therefor by the public key v_i.

After the authentication, an IPv6 global address is generated from the prefix of the IPv6 global address assigned to the router 202 and the interface ID of the host 206, and an anonymous public key certificate APC_ca(i) including a lifetime (validity period, for example 24 hours) is generated. More specifically, the management/attribute information X of the certificate in the APC_ca(i)=(g', v_i', X, Sig_ca(g', v_i', X)) mentioned before includes the IPv6 global address and the lifetime. The lifetime (validity period) of the IPv6 global address is not necessarily same as the validity period of the anonymous public key certificate.

Then, in a step S104, the router 202 transmits the Certificate Advertisement, formed by the prefix of the IPv6 global address, the address of the default router 202 and the anonymous public key certificate APC_ca(i), to the authenticated host 206 through the link 207. In an embodiment of the present invention, this Certificate Advertisement is transmitted after encrypting with the registered public key.

In a step S105, the host 206 extracts the prefix from the received Certificate Advertisement, generates the IPv6 global address by attaching the interface ID, and also confirms the legitimacy of the anonymous public key certificate APC_ca (i). Thus the anonymous public key certificate APC_ca(i) includes an validity period in the management/attribute information X, and the public keys g' and v_i' contained in the anonymous public key certificate APC_ca(i) are the public keys of a same entity i (host 206) but are changed with the lapse of time. The host 206 executes the anonymous public key certificate issuing protocol shown in FIG. 1, for each session, or transmission of a communication packet, thereby changing the public keys g' and v_i' to be used.

Figure 11:
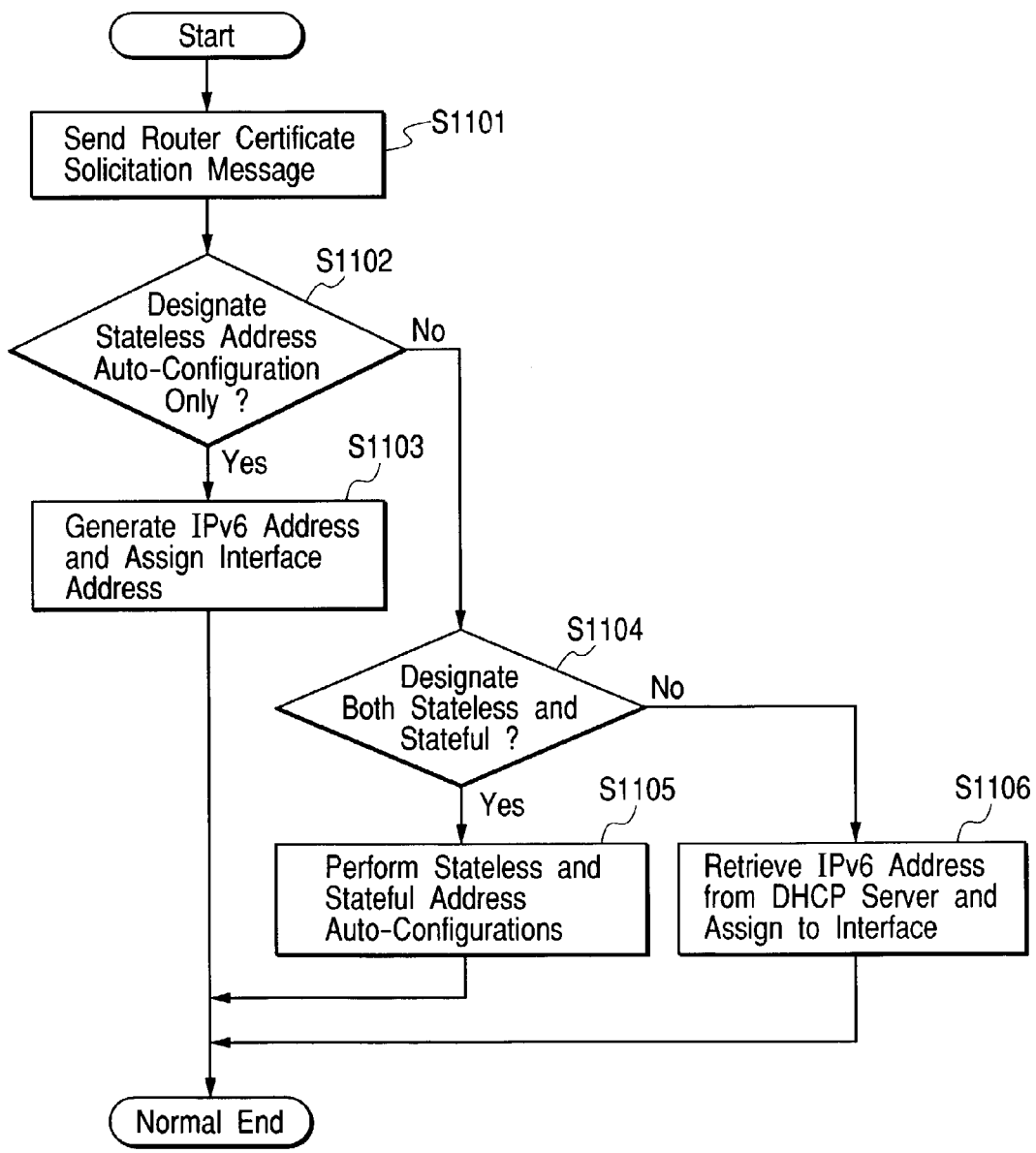
FIG. 11 is a flow chart showing operations until the host executes an address autoconfiguration and receives an anonymous public key certificate.

FIG. 11 shows a flow chart showing the host operation in extended protocol in which the above-described protocol is combined with a known transmission/reception protocol for the Router Solicitation and Router Advertisement.

In a step S1101 in FIG. 11, the host 206 transmits, through the link 207, a Router Certificate Solicitation Message including both the Router Solicitation Message transmitted the step S901 shown in FIG. 9 and the Certificate Solicitation transmitted in the step S102 shown in FIG. 1.

In a step S1102, it receives a Router Certificate Advertisement Message including both the Router Advertisement Message received in the step S902 shown in FIG. 9 and the Certificate Advertisement received in the step S104 shown in FIG. 1.

In case of receiving the Router Certificate Advertisement Message through the link 207, namely in a case "YES" in a step S1102, the host 206 in a step S1103 assigns, as in the step S903 in FIG. 9, an address prepared by adding the interface ID to the prefix in the Router Advertisement Message to the interface 301 as a site local address or a global address, and also executes the step S105 in FIG. 1, thereby acquiring the anonymous public key certificate APC_ca(i) including the public keys g' and v_i'.

Through the above-described protocol, it is rendered possible to issue, to the host 206, a one-time IPv6 address and a corresponding one-time anonymous public key certificate by simply increasing the data, without changing the number of steps of the conventional protocol.

Figure 12:
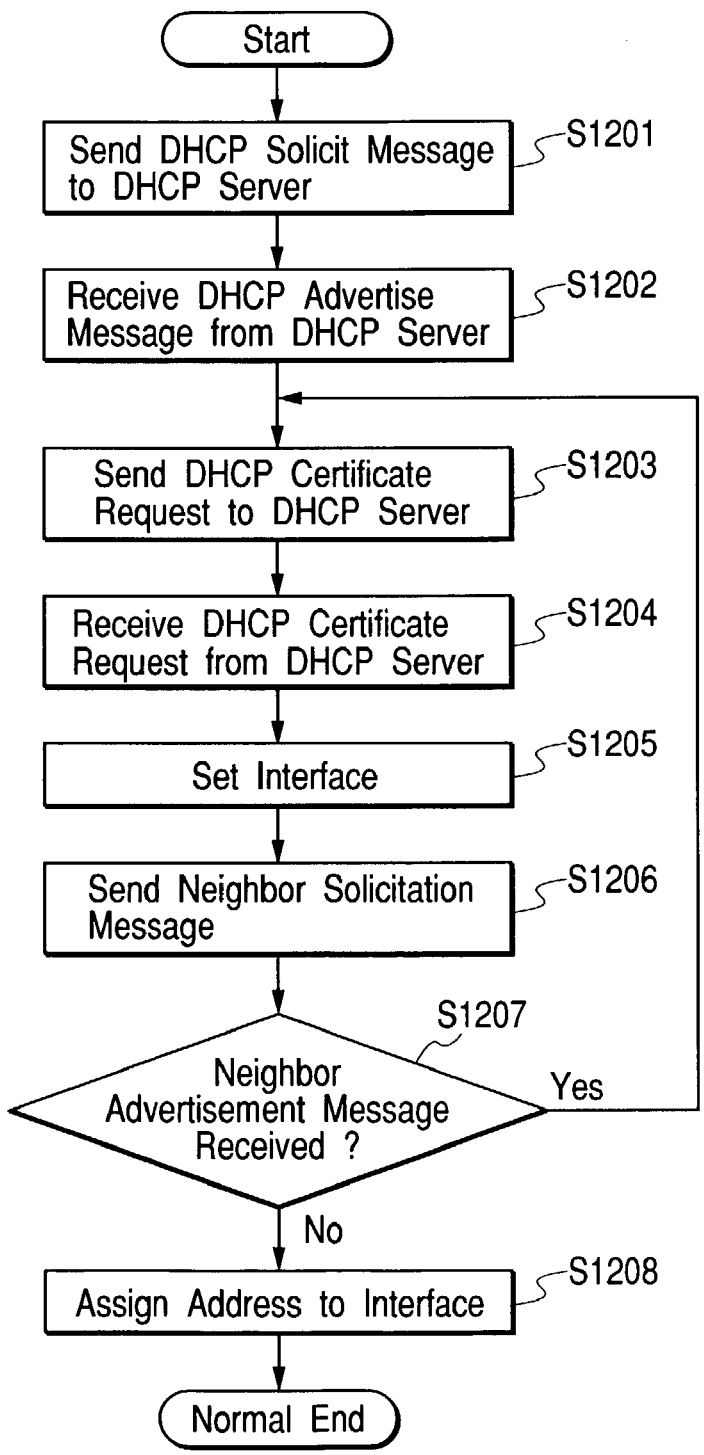
FIG. 12 is a flow chart showing operations until the host receives an address and an anonymous public key certificate by DHCP.

In case the DHCP server 203 serves as the entity CA for issuing the anonymous public key certificate instead of the router 202, a step S1106 in FIG. 11 executes a protocol similar to that in FIG. 1. In this case, the DHCP server 203 provides the host 206 with the prefix for the global address. In this case, in a step S1106 in FIG. 11, the host executes an extended protocol for stateful address autoconfiguration, namely a protocol of acquiring the address and the certificate from the DHCP server. FIG. 12 shows a flow chart of the operations of such protocol.

This flow chart is different from that shown in FIG. 10 in two points, namely in steps S1203 and S1204.

In a step S1203, there is transmitted, through the link 207, a DHCP Certificate Request Message, which includes both the DHCP Request Message transmitted in the step S1003 in FIG. 10 and data corresponding to the Certificate Solicitation transmitted in the step S102 in FIG. 1 (data being different in that CA is not the router 202 but the DHCP server 203).

Upon receiving the DHCP Certificate Request Message, the DHCP server 203 generates a DHCP Certificate Reply Message and transmits the generated DHCP Certificate Reply Message through the link 207. Then the DHCP server 203 generates an anonymous public key certificate APC_ca(i) as in the step S103 in FIG. 1 and includes, in the DHCP Certificate Reply Message, the prefix of the global address of the DHCP server 203, the address of the DHCP server 203, data corresponding to the Certificate Advertisement formed by the anonymous public key certificate APC_ca(i) and the DHCP Reply Message of the step S1004 of FIG. 10.

In a step S1204, the host 206 receives the DHCP Certificate Reply Message, which includes both the DHCP Reply Message received in the step S1004 in FIG. 1 and data corresponding to the Certificate Advertisement received in the step S104 in FIG. 1 (data being different in that CA is not the router but the DHCP server). Thus the host determines the site local address or the global address from the DHCP Reply Message and acquires the anonymous public key certificate APC_ca(i) containing the public keys g' and v_'.

Through the above-described protocol, it is rendered possible to issue, to the host 206, a one-time IPv6 address and a corresponding one-time anonymous public key certificate by simply increasing the data, without changing the number of steps of the conventional protocol.

A case where both the router 202 and the DHCP server 203 function as the CA corresponds to a situation of receiving the Router Certificate Advertisement Message designating both stateless and stateful in a step S1104 in FIG. 11 (case "YES"), and, in such case, it is possible to apply the aforementioned two extended protocols in an arbitrary combination thereby achieving automatic setting and acquisition of the link local address, the site local address, the one-time IPv6 global address, the corresponding one-time anonymous public key certificate and the default gateway. In such case, the router 202 and the DHCP server 203 correspond to a communication apparatus group providing the anonymous public key certificate.

The host 206 executes the protocol for receiving the anonymous public key certificate shown in FIG. 11 for every communication counterpart, for every session or for every transmission of a communication packet, thereby changing to the public keys g' and v_i' to be used.

In the foregoing, there has been explained an embodiment in which the DHCP server 203 provides the prefix of the IPv6 address, but an embodiment of providing the IPv6 address itself can also be realized by a same protocol except that the address is transmitted instead of the prefix and that the process of address generation by the host is dispensed with.

Second Embodiment

In the first embodiment, the default gateway (router) serving as the CA sends the anonymous public key certificate and the Certificate Advertisement including the prefix to the host,. after authentication of the host. In the present embodiment, there will be explained a case in which the sending of the prefix and the issuance of the anonymous public key certificate are independent.

As in the first embodiment, the default gateway 202 or the DHCP server 203 becomes the entity CA for issuing the anonymous public key certificate, while the host 206 (or the user thereof) becomes the entity utilizing the anonymous public key certificate. Otherwise, there may be provided an exclusive CA server for executing the issuance of the certificate only. In the following, there will be explained a case where the default gateway 202 serves as the entity CA issuing the anonymous public key certificate and a random IPv6 address is included in the certificate, but it is also possible that the DHCP server or the exclusive CA server becomes the entity CA issuing the anonymous public key certificate or that the random IPv6 address is not included in the certificate. The default gateway 202 provides the host 206 with a prefix of the global address of IPv6. The default gateway 202, which is often a router as explained before, will be called a router 202.

The administrator of the router 202 determines and discloses the aforementioned public parameters p, g etc. Also it determines the public key v_ca for the entity CA issuing the anonymous public key certificate, and submits it to an upper or more pervasive CA (209 in FIG. 2), for example VeriSign providing a commercial authentication service, to receive a public key certificate for the public key v_ca.

When a user i applies for an access to the LAN, the user generates its own secret key s_i utilizing the public parameters p, g etc., calculates a corresponding public key v_i and submits the user name, the password and the public key v_i to the administrator of LAN (administrator of the router 202). The administrator of LAN (administrator of the router 202), after executing an identification of the user i and a password check according to its operating policy, permits an access. The administrator makes a registration in the RAM 304 or the HD 306 in such a manner that the corresponding public key can be retrieved from the entity name. The public parameters p, g etc. and the public key v_i, and particularly the secret key s_i are managed by the user i and are made securely usable in the host 206.

Figure 15:
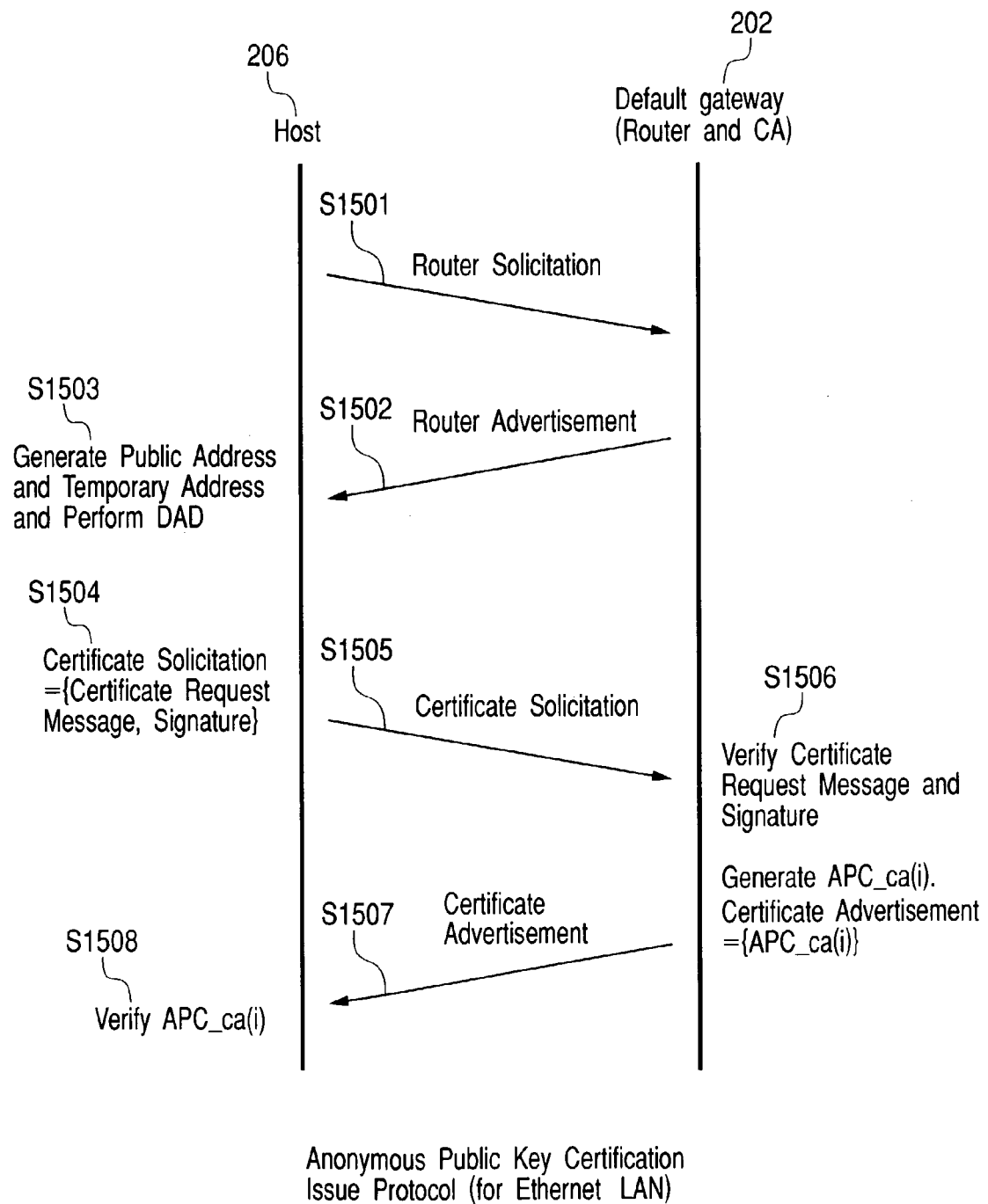
FIG. 15 is a view showing a protocol for issuing an anonymous public key certificate (for Ethernet® LAN) in a second embodiment.

FIG. 15 shows a protocol of the present embodiment, which is executed after the aforementioned preparations. FIG. 15 shows an issuing protocol for an anonymous public key certificate between an entity utilizing the anonymous public key certificate (IPv6 terminal utilized by the user i), constituted by the host 206 and an entity CA which is an IPv6 terminal providing the prefix, issues the anonymous public key certificate, and is constituted by the router 202. Thus an IPv6 supporting apparatus 202, present in a local link 207, serves as the issuer of the public key certificate.

Since it is necessary to specify the entity in order to issue the anonymous public key certificate, there is executed a specifying (authentication) protocol between the router 202 and the entity (host 206 in this case). In the present embodiment, there will be explained a system based on a public key encryption as will be explained in the following. The operations will be explained according to a flow in FIG. 15.

The host 206, after being powered or re-booted, generates an interface ID from a MAC address of the network interface (301 in FIG. 3). Also the host 206 generates a random interface ID by an algorithm for example of RFC 3041. Then, it generates a link local address by attaching the interface ID generated from the MAC address to a predetermined prefix, executes DAD, and sends a Router Solicitation (RS) to the router (step S1501). The RS is multicast to all the routers on the link, as explained before.

Upon receiving the RS, the router 202 sends a Router Advertisement (RA) (step S1502).

Upon receiving the RA, the host 206 extracts the prefix contained in the RA and generates a global address (called public address) from the interface ID generated from the MAC address and the extracted prefix. It also generates a one-time IPv6 address (called temporary address) from a random interface ID and the extracted prefix. It then executes a DAD (duplicate address detection) for detecting duplication of the public address and the temporary address, thereby confirming the uniqueness of the address in the link, and assigns these addresses to the interface (step S1503).

Then the host 206 generates a Certificate Solicitation (step S1504). The certificate Solicitation is a message requesting an anonymous public key certificate and is generated in such a format understandable to the router 202 that the host 206 requests an anonymous public key certificate. Such format is defined for example by PKC#10 in RFC 2986 "PKCS #10: Certification Request Syntax Specification Version 1.7", or by RFC 2511 "Internet X.509 Certificate Request Message Format". Though the details of the format are not explained, but the Certificate Solicitation is assumed to be constituted by a certificate request message and a signature (of host) therefor.

Then the host 206 sends the Certificate Solicitation to the router 202 through the link 207 ((step S1505). Unicasting is possible because the host 206 knows the (unicast) address of the router 202.

The router 202 retrieves the public key v_i from the RAM 305 or the HD 306 based on the entity name (identifier of the host 206 or the name of the user utilizing the host 206) contained in the Certificate Solicitation received in the step S1505, and confirms the legitimacy of the signature utilizing such public key. After the confirmation, there is prepared an anonymous public key certificate APC_ca(i) of the host 206. More specifically, the IPv6, lifetime etc. are included in the management/attribute information X of the certificate in the aforementioned APC_ca(i)=(g', v_i', X, Sig_ca(g', v_i', X)) (step S1506).

Then the router 202 sends the Certificate Advertisement including the anonymous public key certificate APC_ca(i) to the authenticated host 206 through the link 207 (step S1507). In an embodiment of the present invention, this Certificate Advertisement is transmitted after encrypting with the registered public key. In this operation, it may be unicast to the temporary address.

Based on the received Certificate Advertisement, the host 206 confirms the legitimacy of the anonymous public key certificate APC_ca(i) (step S1508).

Figure 17:
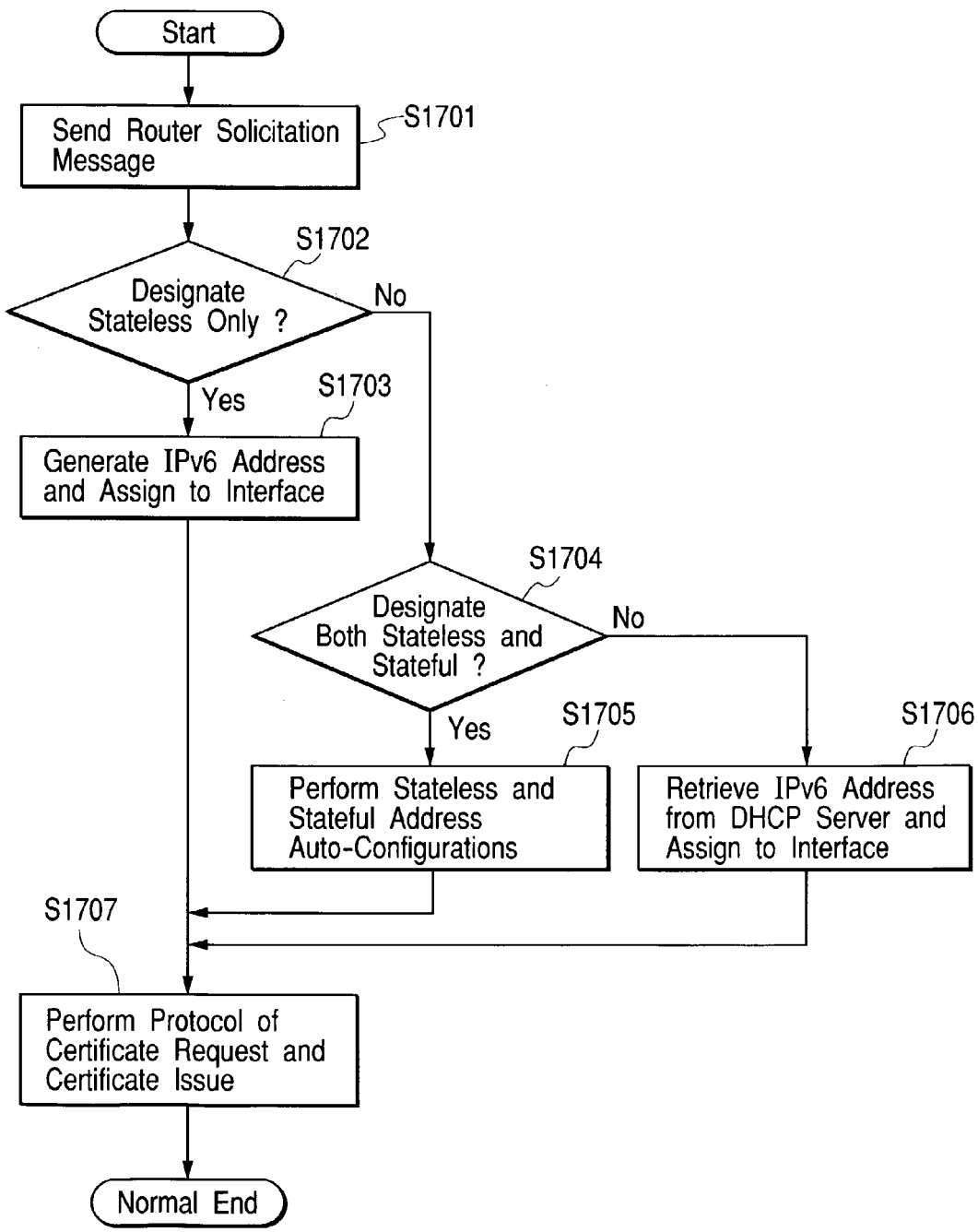
FIG. 17 is a flow chart showing operation until the user retrieves a certificate.

FIG. 17 shows a flow chart showing the host operation in extended protocol in which the above-described protocol is combined with already known stateless address autoconfiguration and stateful address autoconfiguration.

The host 206, after being powered or re-booted, generates an interface ID from a MAC address of the network interface (301 in FIG. 3). Also the host 206 generates a random interface ID by an algorithm for example of RFC 3041. Then, it generates a link local address by attaching the interface ID generated from the MAC address to a predetermined prefix, executes DAD, and sends a Router Solicitation (RS) to the router (step S1701). The RS is multicast to all the routers on the link, as explained before.

In case of receiving the Router Advertisement Message (RA) designating the stateless address autoconfiguration, namely in a case "YES" in a step S1702, the host 206 extracts the prefix contained in the RA and generates a global address (called public address) from the interface ID generated from the MAC address and the extracted prefix. It also generates a one-time IPv6 address (called temporary address) from a random interface ID and the extracted prefix.

It then executes a DAD (duplicate address detection) for detecting duplication of the public address and the temporary address, thereby confirming the uniqueness of the address in the link, and assigns these addresses to the interface (step S1703).

Then the host 206 executes a protocol for requesting and issuing the certificate (step S1707). More specifically, the host 206 generates the Certificate Solicitation as in the steps S1504, S1505 in FIG. 15, and sends it to the router 202. The host 206 receives the Certificate Advertisement from the router 202 and confirms the legitimacy of the anonymous public key certificate APC_ca(i) contained therein.

In case no Router Advertisement is received (corresponding to the case "NO" in a step S1704), there is only executed the stateful address autoconfiguration, namely DHCPv6. This operation corresponds to a step S1706, of which details are same as in the protocol shown in FIG. 10.

In case the step S1704 receives a Router Advertisement message designating both the stateless address autoconfiguration and the stateful address autoconfiguration, a step S1705 executes both the stateless address autoconfiguration and the stateful address autoconfiguration. The content of the process is same as that of the steps S1703 and S1706.

Figure 16:
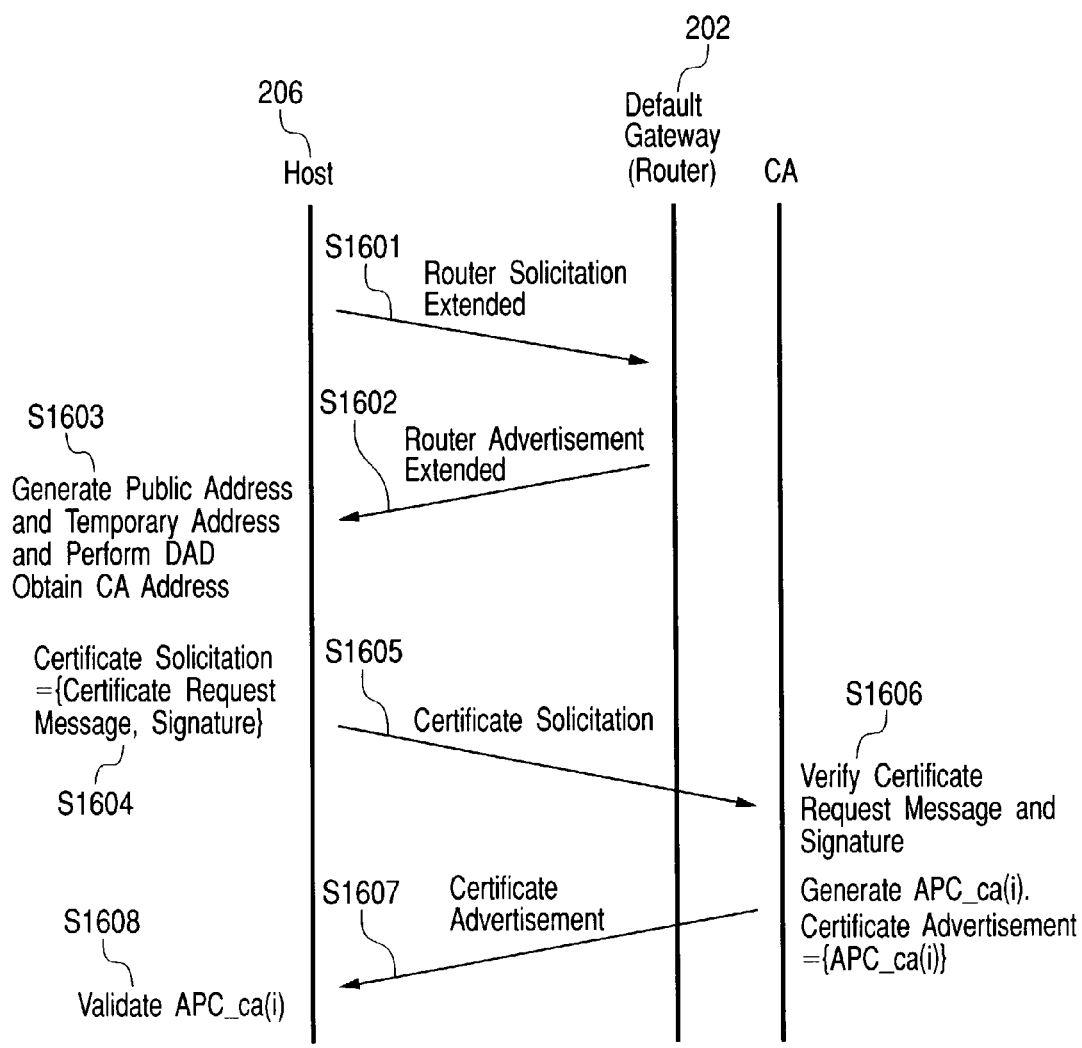
FIG. 16 is a view showing a general protocol for issuing an anonymous public key certificate.

In the foregoing description, the default gateway 202 (router) serves as the CA, but in general the default gateway (router) and the CA are not necessarily a same IPv6 supporting apparatus. FIG. 16 shows a flow chart of the operations-in case the default gateway (router) and the CA are constituted by different IPv6 apparatuses.

The administrator of the CA determines and discloses the aforementioned public parameters p, g etc. Also it determines the public key v_ca for the entity CA issuing the anonymous public key certificate, and submits it to an upper or more pervasive CA (209 in FIG. 2), for example VeriSign providing a commercial authentication service, to receive a public key certificate for the public key v_ca.

When a user i applies for an access to the LAN, the user generates its own secret key s_i utilizing the public parameters p, g etc., calculates a corresponding public key v_i and submits the user name, the password and the public key v_i to the manager of CA. The manager of CA, after executing an identification of the user i and a password check according to its operating policy, permits an access. The administrator makes a registration in the RAM 304 or the HD 306 in such a manner that the corresponding public key can be retrieved from the entity name. The public parameters p, g etc. and the public key v_i, and particularly the secret key s_i are managed by the user i and are made securely usable in the host 206.

The administrator of the default gateway (router) 202 and the administrator of the CA may be same or different. In FIG. 16, the default gateway 202 (router) and the CA are different IPv6 apparatuses and the IPv6 address of the CA is set in the default gateway.

The host 206, after being powered or re-booted, generates an interface ID from a MAC address of the network interface (301 in FIG. 3). Also the host 206 generates a random interface ID by an algorithm for example of RFC 3041. Then it generates a link local address as explained in the foregoing, executes DAD, and sends a Router Solicitation extended (RS extended) to the router (step S1601). The RS extended is information formed by adding a message of requesting the CA address to the Router Solicitation, and is multicast to all the routers on the link, like the aforementioned RA.

Upon receiving the RS extended, the router 202 sends a Router Advertisement extended (RA extended) (step S1602). The RA extended is information formed by adding the address of the CA to the Router Advertisement.

Upon receiving the RA extended, the host 206 extracts the prefix contained in the RA extended and generates a global address (called public address) from the interface ID generated from the MAC address and the prefix. It also generates a one-time IPv6 address (called temporary address) from a random interface ID and the extracted prefix. It then executes a DAD (duplicate address detection) for detecting duplication of the public address and the temporary address, thereby confirming the uniqueness of the address in the link, and assigns these addresses to the interface. Also the address of CA is extracted from the RA extended (step S1603).

Then the host 206 generates a Certificate Solicitation (step S1604) and sends it to the CA (step S1606).

The router 202 retrieves the registered public key v_i from the RAM 305 or the HD 306 based on the entity name (identifier of the communication apparatus (host) 206) contained in the Certificate Solicitation received in the step S1605, and confirms the legitimacy of the signature utilizing such public key. After the confirmation, there is prepared an anonymous public key certificate APC_ca(i) of the host 206. More specifically, the IPv6, lifetime etc. are included in the management/attribute information X of the certificate in the aforementioned APC_ca(i) =(g', v_i', X, Sig_ca(g', v_i', X)) (step S1606)

Then the CA sends the Certificate Advertisement including the anonymous public key certificate APC_ca(i) to the host 206 (step S1607). In an embodiment of the present invention, this Certificate Advertisement is transmitted after encrypting with the registered public key.

Based on the received Certificate Advertisement, the host 206 confirms the legitimacy of the anonymous public key certificate APC_ca(i) (step S1608).

A flow chart of the host operation in an expanded protocol in which the above-described protocol is combined with already known stateless address autoconfiguration and stateful address autoconfiguration is similar to that shown in FIG. 17, but is different in following two points. Namely in the step S1701, a Router Solicitation extended message is transmitted instead of the Router Solicitation Message, and, in the step S1707, a protocol shown in FIG. 16 is executed as the protocol for requesting and issuing the certificate.

Third Embodiment

This embodiment shows a case where a host is connected to the internet by a dial-up method or by ADSL. At first there will be explained a current situation, and the present embodiment will be explained later.

Figure 14:
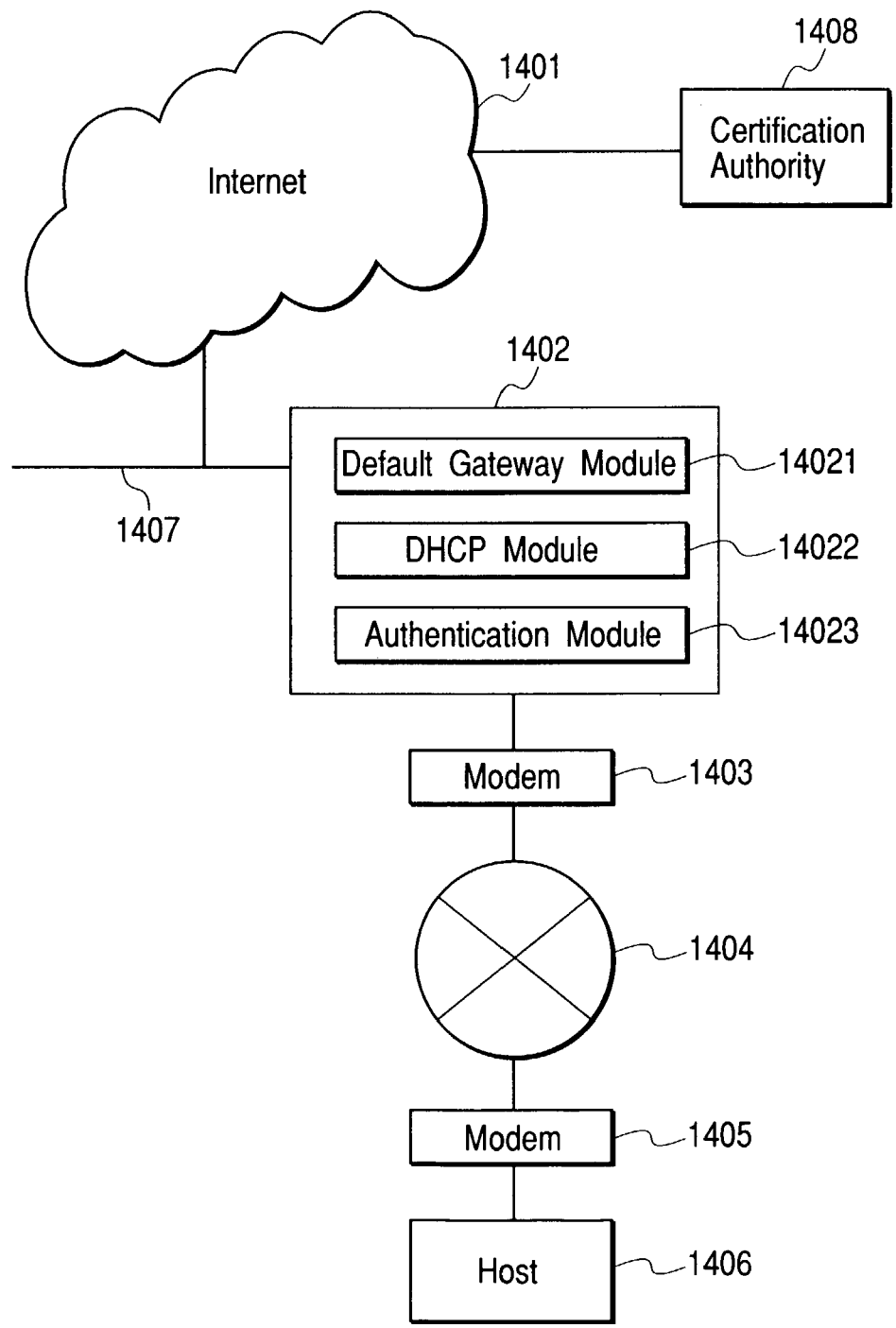
FIG. 14 is a block diagram of a dial-up/ADSL connection.

FIG. 14 schematically shows a connection environment in which the present invention is applicable. FIG. 14 shows an environment in which a host 1406 is connected with an internet 1401 provided by an ISP (Internet Service Provider) through a PSTN (Public Switched Telephone Network). In the present embodiment, the ISP and the host are connected by a PPP link.

In FIG. 14, a PPP peer 1402 of the ISP is a node, which accepts a request for PPP connection from the host 1406, utilizing a modem 1403 and through the PSTN 1404. The host 1406 accesses to the PPP peer 1402 by a PPP connection utilizing a modem 1405. The host 1406 has an architecture similar to that shown in FIG. 3, and is connected to the modem 1405 through the network interface 301. Also the PPP peer 1402 has an architecture similar to that shown in FIG. 3, and is connected to the modem 1403 through the network interface 301 and to the internet 1401 through a network interface 302. As shown in FIG. 14, the PPP peer 1402 functions as a default gateway module 14021, a DHCP module 14022 and an authentication module 14023. In case of a communication between the host 1406 and the PPP peer 1402, the host 1406 executes communication through a model 1405 while the PPP peer 1402 executes communication through a model 1403.

In the present embodiment, there will be explained a configuration employing a modem and a PSTN as an example, but, the situation is basically same in other forms of communication such as a PHS communication adaptor and a PHS communication network, or an exclusive line connecting apparatus and an exclusive line, as long as the PPP connection can be established. The details of the PPP connection are described in RFC 1661 "The point-to-point Protocol (PPP)".

The host 1406 transmits a request for PPP connection to the PPP peer 1402 through a modem 1405, a PSTN 1404 and a modem 1403. In response to such connection request, the authentication module 14023 of the PPP peer 1402 executes an authentication of the host. A typical authentication process is an authentication protocol CHAP based on the user name and the password, of which details are described in RFC 1994 "PPP Challenge Handshake Authentication Process".

After the authentication, the DHCP module 14022 transmits, according to the setting, the prefix of the IPv6 global address and the IPv6 address of the default gateway to the host 1406. The DHCP module 14022 is set by the administrator of the ISP according to the operating policy thereof.

In FIG. 14, for the purpose of simplicity, the default gateway, the DHCP server and the authentication server are assumed to be present respectively as the default gateway module 14021, the DHCP module 14022 and the authentication module 14023 provided in the PPP peer, but they may in fact be present as respectively different nodes in the link 1407. In fact any form is acceptable as long as such module or node is securely operated under the management by the administrator of ISP, it is assumed, in the following description, that a PPP link is established between the host 1406 and the PPP peer 1402 in the configuration shown in FIG. 14.

The host 1406, after receiving the prefix of the IPv6 global address, the IPv6 address of the default gateway etc. from the DHCP module 14022, generates a random IPv6 global address by combining the prefix of the IPv6 global address and an own random interface ID (generated for example according to RFC 3041), then, after confirming the absence of duplication thereof in the link, assigns it to the interface 301 and memorizes the IPv6 address of the default gateway.

Through the foregoing operations, the host 1406 can communicate with an arbitrary counterpart in the internet, using the one-time IPv6 address.

In the following there will be explained an embodiment of the present invention, in which the aforementioned operations (protocol) are extended to provide a protocol enabling the use of a one-time anonymous public key certificate.

In the following, there will be explained a case of applying the anonymous public key certification to an environment shown in FIG. 14. The PPP peer 1402 functions as the CA issuing the anonymous public key certificate, while the host 1406 (or the user thereof) functions as the entity i utilizing the anonymous public key certificate. In the following there will be explained an embodiment of including a random IPv6 address in the certificate, but it is also possible not to include such random IPv6 address.

The ISP determines and discloses the aforementioned public parameters p, g etc. Also it determines its public key v_ca, and submits it to an upper or more pervasive CA (1408 in FIG. 14), for example VeriSign providing a commercial authentication service, to receive a public key certificate for the public key v_ca.

When a user i applies for an entry in the ISP, the user generates its own secret key s_i utilizing the parameters p, g etc. disclosed by the ISP, calculates a corresponding public key v_i and submits the user name, the password and the public key v_i to the ISP. The administrator of ISP (administrator of PPP peer 1402), after executing an identification of the user i and a password check according to its operating policy, permits an access. The manager makes a registration in the RAM 304 or the HD 306 in such a manner that the corresponding public key can be retrieved from the user name. The public parameters p, g etc. and the public key v_i, and particularly the secret key s_i are managed by the user i and are made securely usable in the host 1406.

Figure 13:
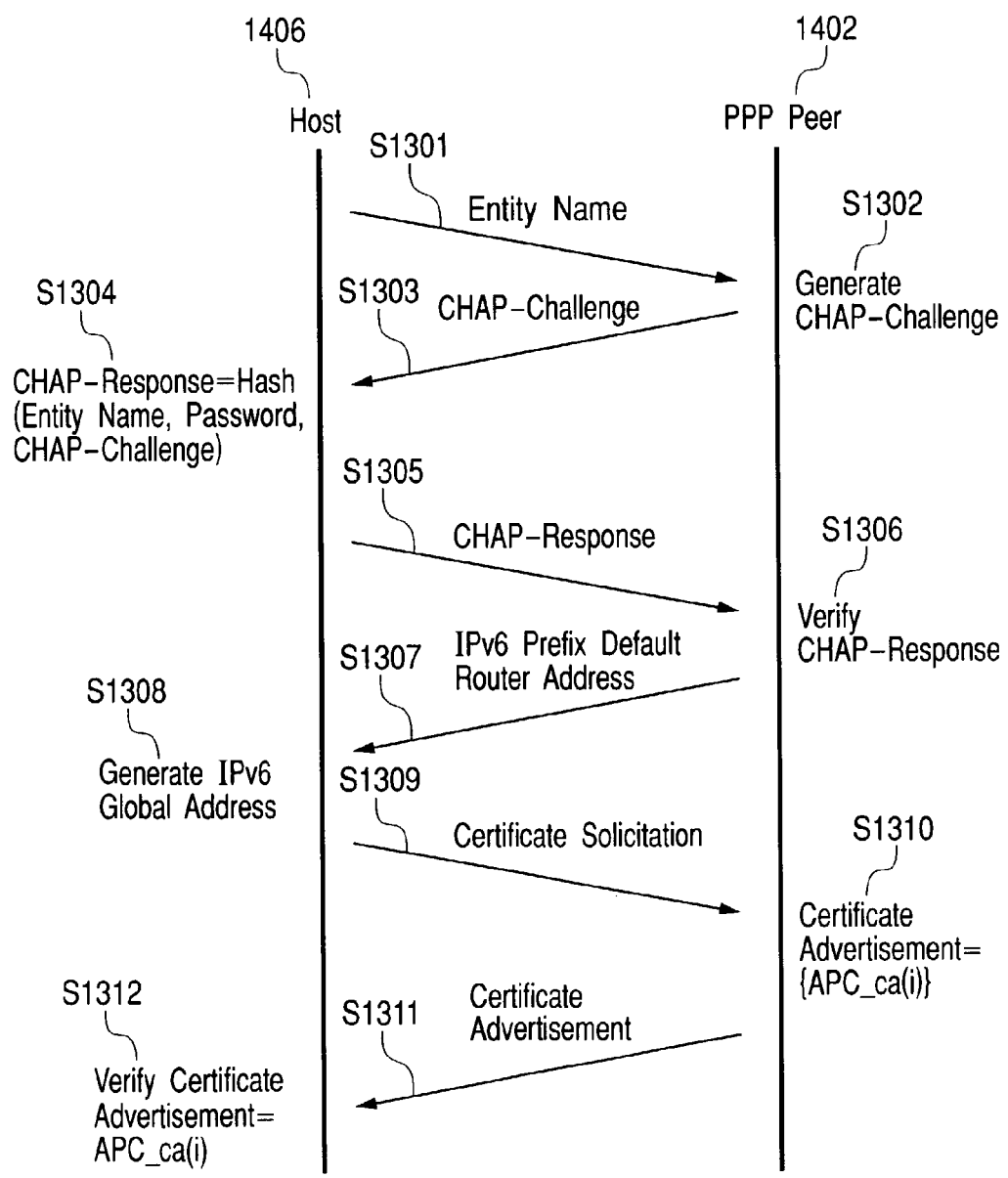
FIG. 13 is a view showing a protocol for issuing an anonymous public key certificate (for PPP) in a third embodiment.

FIG. 13 shows a protocol of the present embodiment, which is executed after the aforementioned preparations. FIG. 13 shows an issuing protocol for an anonymous public key certificate between an entity utilizing the anonymous public key certificate (IPv6 terminal utilized by the user i), constituted by the host 1406 and an entity CA issuing the anonymous public key certificate, and constituted by the PPP peer 1402.

In establishing a PPP connection, after a process in the data link layer is finished, the PPP peer 1402, receiving a request for a PPP connection from the host 1406, causes the authentication module 14023 to authenticate the host by an authentication protocol CHAP based on the user name (identifier) and the password.

More specifically, in a step S1301, the host 1406 sends the entity name (user name) to the PPP peer 1402. The PPP peer 1402 generates a CHAP-challenge in a step S1302, and sends it to the host 1406 in a step S1303.

In a step S1304, the host 1406 enters the entity name, the password and the CHAP-challenge into the Hash function to determine a CHAP-response, and, in a step S1305, sends a value of the determined CHAP-response to the PPP peer 1402.

In a step S1306, the PPP peer 1402 confirms the legitimacy of the CHAP-response. After the successful authentication by the confirmation, the prefix of the IPv6 global address and the address of the default gateway are transmitted to the authenticated host 1406 in a step S1307.

In a step S1308, the host 1406 generates an IPv6 global address by combining the prefix of the IPv6 global address and a random interface ID, then, after confirming the absence of duplication thereof, assigns it to the network interface 301 and also memorizes the address of the default gateway. Then, in a step S1309, it sends a Certificate Solicitation as a message requesting an anonymous public key certificate As in the first embodiment, the Certificate Solicitation is generated in such a format understandable to the PPP peer 1402 that it requests an anonymous public key certificate and that it contains the interface ID. The content is calculated from the entity name (user name), the password and a serial number, and the serial number is, for example, formed by concatenating an IPv6 link local address of the host 1406, an IPv6 link local address of the default gateway and a current time. The Certificate Solicitation contains a digital signature (authenticating signature) generated by entering the entity name (user name), the password and the serial number into the Hash function.

The PPP peer 1402 retrieves the registered public key v_i from the RAM 305 or the HD 306 based on the entity name (user name of the communication apparatus (host) 1406), and, in a step S1310, executes generation of an anonymous public key as explained in S103 in FIG. 1. More specifically, an IPv6 global address is generated from the prefix of the IPv6 global address assigned to the PPP peer 1402 and the interface ID of the host 1406, and an anonymous public key certificate APC_ca(i) including the lifetime thereof etc. is prepared. Thus the IPv6 global address, lifetime etc. are included in the management/attribute information X of the aforementioned certificate APC_ca(i)=(g', v_i', X, Sig_ca(g', v_i', X)).

Then, in a step S1311, as in the step S104 in FIG. 1, a Certificate Advertisement including the generated anonymous public key certificate APC_ca(i) is sent to the host 1406. In a step S1312, the host 1406 confirms the legitimacy of the received anonymous public key certificate APC_ca(i). Thus the anonymous public key certificate APC_ca(i) includes a validity period in the management/attribute information X, and the public keys g' and v_i' contained in the anonymous public key certificate APC_ca(i) are the public keys of a same entity i (host 1406) but are changed with the lapse of time.

In the foregoing protocol, the data sent and received in the steps S1305 and S1309 may be collectively sent in the step S1305. In such case, though not illustrated, the host 1406 sends the random interface ID, the CHAP-response of the step S1305 in FIG. 13 and the Certificate Solicitation of the step S1309 (similar to that in the first embodiment) to the PPP peer 1402 in a step S1305'.

Then, in a step S1306', the PPP peer 1402 confirms the legitimacy of the CHAP-response, retrieves the registers the public key v_i, generates the IPv6 global address from the IPv6 prefix and the interface ID, and generates data including such global address and its lifetime (effective term of use, for example 24 hours) thereby generating the anonymous public key certificate APC_ca(i). Then, in a step S1307', a Certificate Advertisement including. the generated anonymous public key certificate APC_ca(i) is sent to the host 1406.

The host 1406 confirms the legitimacy of the received anonymous public key certificate APC_ca(i) in a step S1308'. There are no subsequent steps because the process corresponding to the step S1312 in FIG. 13 is completed by this step S1308'.

Through the aforementioned protocol, the PPP peer 1402 issues a one-time IPv6 address and a corresponding one-time anonymous public key certificate.

The host 1406 executes the anonymous public key certificate issuing protocol shown in FIG. 13 for every communication counterpart, every session or every transmission of a communication packet, thereby changing the public keys g' and v_i' to be used.

In the foregoing, there has been explained a case where the PPP peer 1402 transmits the IPv6 prefix to the host 1406 and the host 1406 generates the IPv6 address from the IPv6 prefix and the interface ID, but a similar protocol is applicable also in case where the PPP peer 1402 transmits the Piv6 address to the host 1406, which uses such address. The protocol remains same in such case, except that the IPv6 address is sent instead of the IPv6 prefix in the step 1307 and that the process of generating the IPv6 address from the prefix in the step S1308 becomes unnecessary.

Fourth Embodiment

Now there will be explained an embodiment of executing an IPsec communication, utilizing the one-time IPv6 address and the one-time anonymous public key certificate issued in the first, second or third embodiment.

At first there will be given a brief explanation on an authentication method by a revised mode of public key encryption in IKE (Internet Key Exchange), which is a protocol for securely sharing SA (Security Association) constituted by secret data, mutual IPv6 addresses etc., and there will then be explained a method utilizing the anonymous public key certificate.

The IKE is formed by two phases, namely a phase 1 for establishing a secure communication path, and a phase 2 for agreeing to SAs to be used in the communication such as IPsec communication, utilizing such secure communication path. In the following the phase 1 only will be explained. The IKE phase 1 includes a Main mode and an Aggressive mode, and there will be explained, in the following, the Main mode according to RFC 2409 "The Internet Key Exchange (IKE)", pp. 13-15, 5.3, Phase 1 Authenticated with a Revised mode of Public Key Encryption.

In the IKE, two communicating entities are called an Initiator and a Responder. The Initiator starts the communication. At first, the Initiator sends plural SAs to the Responder, which sends an SA, judged appropriate for use, to the Initiator whereby the SA for the phase 1 is determined.

The Initiator generates a random number (called Nonce), and sends data, obtained by encryption with the public key of the Responder, to the Responder. The Responder generates a random number and sends data, obtained by encryption with the public key of the Initiator, to the Initiator. In this manner the respectively generated Nonces can be shared, and an encryption key to be used in another communication is generated from the shared Nonces. The details are described in RFC 2409 "The Internet Key Exchange (IKE)". As will be understood from the foregoing, it is necessary to know the public key of the communication counterpart prior to the IPsec communication.

Now, let us consider a situation where a user accesses to a site on the Internet, such as a shopping site. The user is for example the host 206 in the configuration shown in FIG. 2, or the host 1406 in the configuration shown in FIG. 14. The shopping site is connected, in the configuration shown in FIG. 2, to the host 206 constituting the user through the internet 201 and the gateway 202, and, in the configuration shown in FIG. 14, to the host 1406 constituting the user through the Internet 1401 and the PPP peer 1402. The host 206 or 1406 obtains an IPv6 address and a public key certificate including the public key, prior to the start of a communication with a site such as the aforementioned shopping site. In this configuration, a protocol for exchanging, renewing and changing the key based on the aforementioned public key certificate is executed to achieve an encryption/authentication communication.

In this state, the user knows the IPv6 address (identifier) of the shopping site (whether explicitly or implicitly). After making an actual access and finding that it is a proper site for the user, the user confirms the IPv6 address of the communication counterpart, thereby explicitly knowing the address. Also the shopping site can know the address (identifier) of the communication counterpart, in the course of communication. The above-mentioned communication can be executed with a one-time IPv6 address.

In the present embodiment, it is assumed when the transmitter and the receiver are established, the one-time IPv6 address is not renewed but used in continuation. At this point, the one-time anonymous public key certificates APC_ca(i)= (g', v_i', X, Sig_ca(g', v_i', X)) are mutually sent. Since the management/attribute information X in the one-time anonymous public key certificate APC_ca(i) includes the IPv6 global address, it is rendered possible, by confirming whether such IPv6 address coincides with the IPv6 address of the counterpart in the actual communication and by confirming the legitimacy of the anonymous public key certificate, to judge whether such certificate is a true one-time anonymous public key certificate of the communication counterpart and to confirm whether the public keys (g', v_i') contained therein are the true public keys of the communication counterpart.

The legitimacy of the one-time anonymous public key certificate can be confirmed in the following manner. The management/attribute information X of the certificate includes the public key v_ca of the CA (router 202, DHCP server 203, or PPP peer 1402) and a public key certificate therefor (issued by VeriSign or the like providing the commercial authentication service). The site can confirm whether these have a correct correspondence, utilizing the public key of the VeriSign or the like providing the commercial authentication service (key being widely known and easily available). Then the v_ca, confirmed as legitimate, can be used to confirm legitimacy of the one-time anonymous public key certificates APC_ca(i)=(g', v_i', X, Sig_ca(g', v_i', X)), namely the correct correspondence of (g', v_i') and Sig_ca(g', v_i', X). The anonymous public key certificate APC_ca(i) includes a validity period in the management/attribute information X, and the public keys g' and v_i' contained in the anonymous public key certificate APC_ca(i) are the public keys of a same entity i but are changed with the lapse of time.

The host 206 or 1406 executes the protocol shown in FIG. 11 or 13 for every communication counterpart (namely for every new connection to a site), or every session, thereby renewing or changing the IPv6 address and the public keys g' and v_i' to be used. The public keys g' and v_i' may be renewed or changed for every transmission of a communication packet.

Through the foregoing protocol, it is rendered possible to securely obtain the public key of the communication counterpart defined by the IPv6 address, utilizing the one-time IPv6 address and the one-time anonymous public key certificate including the same. Also by executing the Main mode of the phase 1 of the aforementioned IKE with thus exchanged public keys, there can be realized an IPsec communication with a communication counter part having such IPv6 address.

Thus, in the present embodiment, there are executed an IPsec communication which is a protocol of operating an IPv6 supporting apparatus, present in a local link, as an issuer for the public key certificate, sharing secret information including the IPv6 address in the one-time anonymous public key certificate by only two apparatuses on the internet, and executing encryption and authentication based on such secret data, and an IKE (Internet Key Exchange) which is a protocol of safely sharing SA (Security Association) such as the secret data and the mutual IPv6 addresses, at such IPsec communication.

Consequently it is possible to prevent the impersonation of the communication counterpart as mentioned in the drawback of the known technology.

What is claimed is:

1. A server system including a processor connected to a network, comprising:

acquisition means for acquiring a temporary IP address of a client;

generation means for generating a first public key in accordance with a public parameter such that the first public key is usable corresponding to a first secret key of the client connected to the network, for generating a digital signature based on a second secret key where the second secret key is generated by the server system, and for generating a certificate of the first public key where the certificate of the first public key includes the temporary IP address of the client, a certificate of a second public key, and the digital signature of which legitimacy can be confirmed with the second public key where the second public key is generated by the server system; and sending means for sending the certificate of the first public key generated by said generation means to the temporary IP address of the client, wherein the certificate of the second public key is issued by an authenticating service provider to the server system when the server system submits the second public key to the authenticating service provider.

2. The server system according to claim 1, wherein said sending means sends the certificate of the first public key to the temporary IP address of the client in a subnet.

3. The server system according to claim 1, wherein said providing means provides the client with the first public key certificate and information for determining an address of the client.

4. The server system according to claim 1, further comprising connection means which connects the client, to which the first public key certificate is sent by said sending means, to the Internet.

5. A method for providing a public key certificate generated by a server system including a processor connected to a network, comprising:

acquiring a temporary IP address of a client;

generating a first public key in accordance with a public parameter such that the first public key is usable corresponding to a first secret key of the client connected to the network;

generating a digital signature based on a second secret key where the second secret key is generated by the server system;

generating a certificate of the first public key where the certificate of the first public key includes the temporary IP address of the client, a certificate of a second public key, and the digital signature of which legitimacy can be confirmed with the second public key where the second public key is generated by the server system; and providing the client connected to the network with the generated certificate of the first public key;

wherein the certificate of the first public key is sent by the client to a destination, and the temporary IP address of the client is confirmed by the destination based on the temporary IP address included in the certificate of the first public key, and the certificate of the second public key is issued by an authenticating service provider to the server system when the server system submits the second public key to the authenticating service provider.

6. A method according to claim 5, wherein said providing step provides the client in a subnet with the first public key certificate.

7. A method according to claim 5, wherein said providing step provides the client with the first public key certificate and information for determining an address of the host.

8. A method according to claim 5, further comprising a connection step of connecting the client, to which the first public key certificate is provided in said providing step, to the internet.

9. A server system including a processor comprising, in a subnet, providing means which provides a client in the subnet with a prefix for an IP address of the client and with a certificate of a first public key, further comprising:
- acquisition means for acquiring a temporary IP address of a client;
- generation means for generating the first public key in accordance with a public parameter such that the first public is usable corresponding to a first secret key of the client connected to the network, for generating a digital signature based on a second secret key where the second secret key is generated by the server system, and for generating the certificate of the first public key where the certificate of the first public key includes the temporary IP address of the client, a certificate of a second public key, and the digital signature of which legitimacy can be confirmed with the second public key where the second public key is generated by the server system; and
- sending means for sending the certificate of the first public key generated by said generation means to the temporary IP address of the client,
- wherein the certificate of the second public key is issued by an authenticating service provider to the server system when the server system submits the second public key to the authenticating service provider.

10. A server system including a processor comprising:
- first connection means for executing connection with the Internet;
- second connection means for executing connection with a client via a local network;
- acquisition means for acquiring a temporary IP address of a client;
- generation means for generating a first public key in accordance with a public parameter such that the first public is usable corresponding to a first secret key of the client connected to the network, for generating a digital signature based on a second secret key where the second secret key is generated by the server system, and for generating a certificate of the first public key where the certificate of the first public key includes the temporary IP address of the client, a certificate of a second public key, and the digital signature of which legitimacy can be confirmed with the second public key where the second public key is generated by the server system; and
- sending means for sending the certificate of the first public key to the temporary IP address of the client,
- wherein the certificate of the second public key is issued by an authenticating service provider to the server system when the server system submits the second public key to the authenticating service provider.

11. The server system according to claim 1, wherein said generation means generates the first public key based on a third public key of a user who uses the certificate of the first public key.

12. The server system according to claim 1, wherein said generation means generates the first public key based on a public parameter.

13. The server system according to claim 1, wherein said generation means generates the digital signature based on the first public key and the second secret key corresponding to the second public key.

14. A method according to claim 5, wherein said generation step generates the first public key based on a third public key of a user who uses the certificate of the first public key.

15. A method according to claim 5, wherein said generation step generates the first public key based on a public parameter.

16. A method according to claim 5, wherein said generation step generates the digital signature based on the first public key and the second secret key corresponding to the second public key.

17. The server system according to claim 9, wherein said generation means generates the first public key based on a third public key of a user who uses the certificate of the first public key or based on a public parameter.

18. The server system according to claim 9, wherein said generation means generates the digital signature based on the first public key and the second secret key corresponding to the second public key.

19. The server system according to claim 10, wherein said generation means generates the first public key based on a third public key of a user who uses the certificate of the first public key or based on a public parameter.

20. The server system according to claim 10, wherein said generation means generates the digital signature based on the first public key and the second secret key corresponding to the second public key.

21. A communication apparatus connected to a network, comprising:
- reception means for receiving a certificate of a first public key from a server system including a processor connected to the network, the certificate of the first public key includes a temporary IP address of the communication apparatus, a certificate of a second public keys and a digital signature of which legitimacy can be confirmed with the second public key, wherein the first public key is generated by the server system in accordance with a public parameter such that the first public key is usable corresponding to a first secret key of the client connected to the network, and the digital signature is generated by the server system based on a second secret key where the second secret key is generated by the server system;
- confirming means for confirming the legitimacy of the digital signature with the second public key; and
- informing means for informing the certificate of the first public key to a communication partner in order to identify the temporary IP address of the communication apparatus based on the temporary IP address of the communication apparatus included in the certificate of the first public key,
- wherein the certificate of the second public key is issued by an authenticating service provider to the server system when the server system submits the second public key to the authenticating service provider.

22. A communication method for a communication apparatus connected to a network, comprising steps of:
- receiving a certificate of a first public key from a server system including a processor connected to the network, the certificate of the first public key includes a temporary IP address of the communication apparatus, a certificate of a second public key, and a digital signature of which legitimacy can be confirmed with the second public key, wherein the first public key is generated by the server system in accordance with a public parameter such that the first public key is usable corresponding to a first secret key of the client connected to the network, and the digital signature is generated by the server system based on a second secret key where the second secret key is generated by the server system;

confirming the legitimacy of the digital signature with the second public key; and informing the certificate of the first public key to a communication partner in order to identify the temporary IP address of the communication apparatus based on the temporary IP address of the communication apparatus included in the certificate of the first public key, wherein the certificate of the second public key is issued by an authenticating service provider to the server system when the server system submits the second public key to the authenticating service provider.

23. A method according to claim 5, wherein the generated certificate of the first public key is sent to the temporary IP address of the client.

24. The communication apparatus according to claim 21, wherein said reception means receives the certificate of the first public key sent from the server system to the temporary address of the communication apparatus.

25. A method according to claim 22, wherein the certificate of the first public key sent to the temporary address of the communication apparatus is received in said receiving step.

* * * * *